United States Patent
Maeda et al.

(10) Patent No.: US 9,331,954 B2
(45) Date of Patent: May 3, 2016

(54) FUNCTIONAL DEVICE, ACCESS SYSTEM, AND COMMUNICATION ESTABLISHING METHOD

(71) Applicant: Panasonic Corporation, Osaka (JP)

(72) Inventors: Takuji Maeda, Osaka (JP); Masayuki Toyama, Osaka (JP); Isao Kato, Osaka (JP); Shinichiro Nishioka, Osaka (JP); Satoshi Senga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 287 days.

(21) Appl. No.: 14/072,107

(22) Filed: Nov. 5, 2013

(65) Prior Publication Data

US 2014/0059224 A1 Feb. 27, 2014

Related U.S. Application Data

(63) Continuation of application No. PCT/JP2013/001670, filed on Mar. 13, 2013.

(30) Foreign Application Priority Data

May 8, 2012 (JP) .................. 2012-106422

(51) Int. Cl.
G06F 3/00 (2006.01)
H04L 12/911 (2013.01)
G06F 3/06 (2006.01)

(52) U.S. Cl.
CPC .............. *H04L 47/70* (2013.01); *G06F 3/0611* (2013.01); *G06F 3/0632* (2013.01); *G06F 3/0679* (2013.01)

(58) Field of Classification Search
CPC .... G06F 3/0611; G06F 3/0632; G06F 3/0679
USPC .......................................................... 726/4
See application file for complete search history.

(56) References Cited

U.S. PATENT DOCUMENTS 7,046,519 B2   5/2006   Nakamura
7,457,907 B2   11/2008  Takahashi et al.
(Continued)

FOREIGN PATENT DOCUMENTS

JP   2002-091709 A   3/2002
JP   2002-366919 A   12/2002
(Continued)

OTHER PUBLICATIONS

Supplementary European Search Report for related European Application No. 13779506.8 dated Apr. 1, 2015.
Co-pending U.S. Appl. No. 14/072,062, filed Nov. 5, 2013.
International Search Report for corresponding International Application No. PCT/JP2013/001670 mailed May 7, 2013.
(Continued)

*Primary Examiner* — Ellen Tran
(74) *Attorney, Agent, or Firm* — Renner, Otto, Boisselle & Sklar, LLP

(57) ABSTRACT

A functional device can communicate with an access apparatus through wireless communication. At least one additional device can be connected to the functional device. The functional device includes an access controller that performs an initialization process of the additional device to obtain characteristic information of the additional device from the additional device, before establishing communication between the access apparatus and the functional device, a memory that stores the obtained characteristic information, a communication unit that performs transmission and reception of data with the access apparatus, and a communication controller that transmits the characteristic information stored in the memory to the access apparatus without performing an initialization process of the additional device, upon establishment of communication with the access apparatus by the communication unit.

13 Claims, 9 Drawing Sheets

(56) References Cited

U.S. PATENT DOCUMENTS

| | | | |
|---|---|---|---|
| 2002/0065044 A1* | 5/2002 | Ito | G06K 7/0008 |
| | | | 455/41.2 |
| 2003/0018852 A1 | 1/2003 | McLinn | |
| 2004/0107327 A1 | 6/2004 | Takahashi et al. | |
| 2004/0161978 A1 | 8/2004 | Nakamura | |
| 2006/0053246 A1 | 3/2006 | Lee | |
| 2007/0005829 A1* | 1/2007 | Fujimoto | G06F 13/385 |
| | | | 710/48 |
| 2007/0011395 A1* | 1/2007 | Kim | G06F 13/385 |
| | | | 711/103 |
| 2008/0003946 A1* | 1/2008 | Lee | H04W 8/005 |
| | | | 455/41.2 |
| 2010/0017560 A1 | 1/2010 | Ono et al. | |

FOREIGN PATENT DOCUMENTS

| | | |
|---|---|---|
| JP | 2004-133881 A | 4/2004 |
| JP | 2004-246623 A | 9/2004 |
| JP | 2006-048369 A | 2/2006 |
| JP | 2008-276557 A | 11/2008 |
| WO | WO 2008/032711 A1 | 3/2008 |

OTHER PUBLICATIONS

Form PCT/ISA/237 for corresponding International Application No. PCT/JP2013/001670 mailed May 7, 2013.

International Search Report for related International Application No. PCT/JP2013/001669 mailed May 7, 2013.

Form PCT/ISA/237 for related International Application No. PCT/JP2013/001669 dated May 7, 2013.

English translation of International Preliminary Report on Patentability for corresponding International Application No. PCT/JP2013/001670 mailed Nov. 20, 2014.

English translation of International Preliminary Report on Patentability for related International Application No. PCT/JP2013/001669 mailed May 7, 2013.

U.S. Office Action dated May 11, 2015 for co-pending U.S. Appl. No. 14/072,062.

English translation of International Search Report for corresponding International Application No. PCT/JP2013/001670 mailed May 7, 2013.

English translation of International Search Report for related International Application No. PCT/JP2013/001669 mailed May 7, 2013.

U.S. Office Action dated Oct. 15, 2015 for co-pending U.S. Appl. No. 14/072,062.

* cited by examiner

Fig.3

| CHARACTERISTIC INFORMATION | | REMARKS |
|---|---|---|
| LARGE CLASSIFICATION | SMALL CLASSIFICATION | |
| CAPACITY INFORMATION | TOTAL CAPACITY | OVERALL CAPACITY OF MEMORY |
| | SECTOR SIZE | SIZE OF MANAGEMENT UNIT |
| | ERASE BLOCK SIZE | SIZE OF ERASE UNIT |
| MEMORY STATE | WRITE PROTECT STATE | INFORMATION INDICATING ON / OFF OF WRITE PROTECT SWITCH, SETTING STATE ACCORDING TO WRITE PROTECT COMMAND, AND THE LIKE |
| | LOCK STATE | INFORMATION INDICATING SETTING STATE OF PASSWORD LOCK |
| | MEMORY TYPE (RAM/ROM/OTP) | TYPE OF MEMORY |
| | BUS TYPE | TYPE OF BUS MODE (HIGH SPEED BUS, LOW SPEED BUS, AND SO ON) |
| | IO SUPPORT STATE | PRESENCE OR ABSENCE OF SUPPORT FOR IO FUNCTION |
| IDENTIFIER | VENDOR ID | IDENTIFIER FOR IDENTIFYING MANUFACTURING VENDOR |
| | SERIAL NUMBER | IDENTIFIER FOR IDENTIFYING EACH INDIVIDUAL MEMORY |
| | MEMORY IDENTIFIER | IDENTIFIER FOR IDENTIFYING MEMORY, SUCH AS LUN OR RCA |
| REGISTER | REGISTER FOR STORING IDs | VARIOUS TYPES OF ID INFORMATION |
| | MEMORY CHARACTERISTIC INFORMATION REGISTER | INFORMATION ABOUT CHARACTERISTICS OF MEMORY, SUCH AS CAPACITY AND TIMING SPECIFICATIONS |
| | STATUS INFORMATION REGISTER | INFORMATION ABOUT CURRENT STATE OF MEMORY, SUCH AS LOCK STATE |
| | VOLTAGE CONTROL REGISTER | INFORMATION ABOUT OPERATING VOLTAGE OR THE LIKE |
| | MEMORY IDENTIFIER REGISTER | IDENTIFIER FOR IDENTIFYING MEMORY, SUCH AS LUN AND RCA |

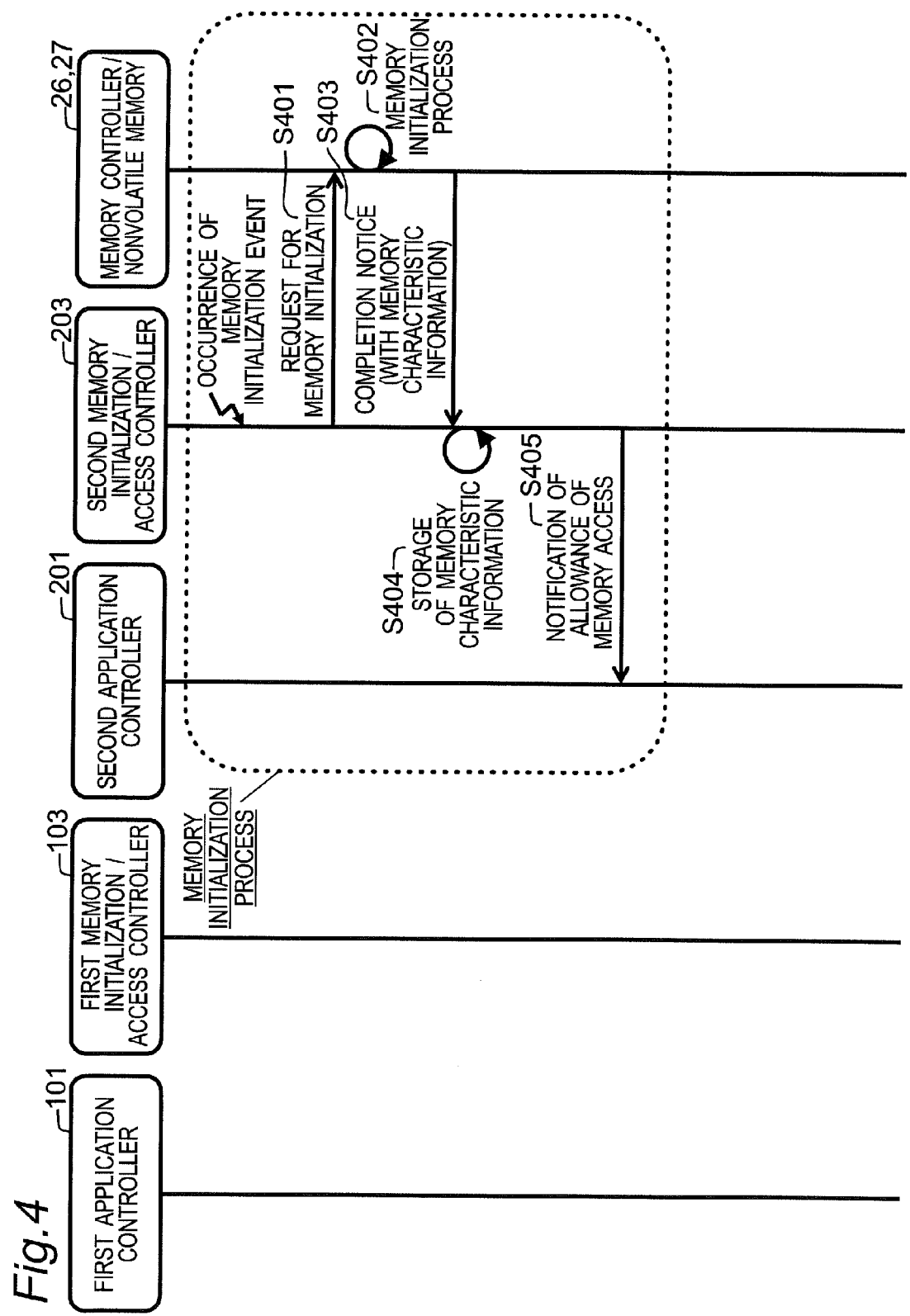

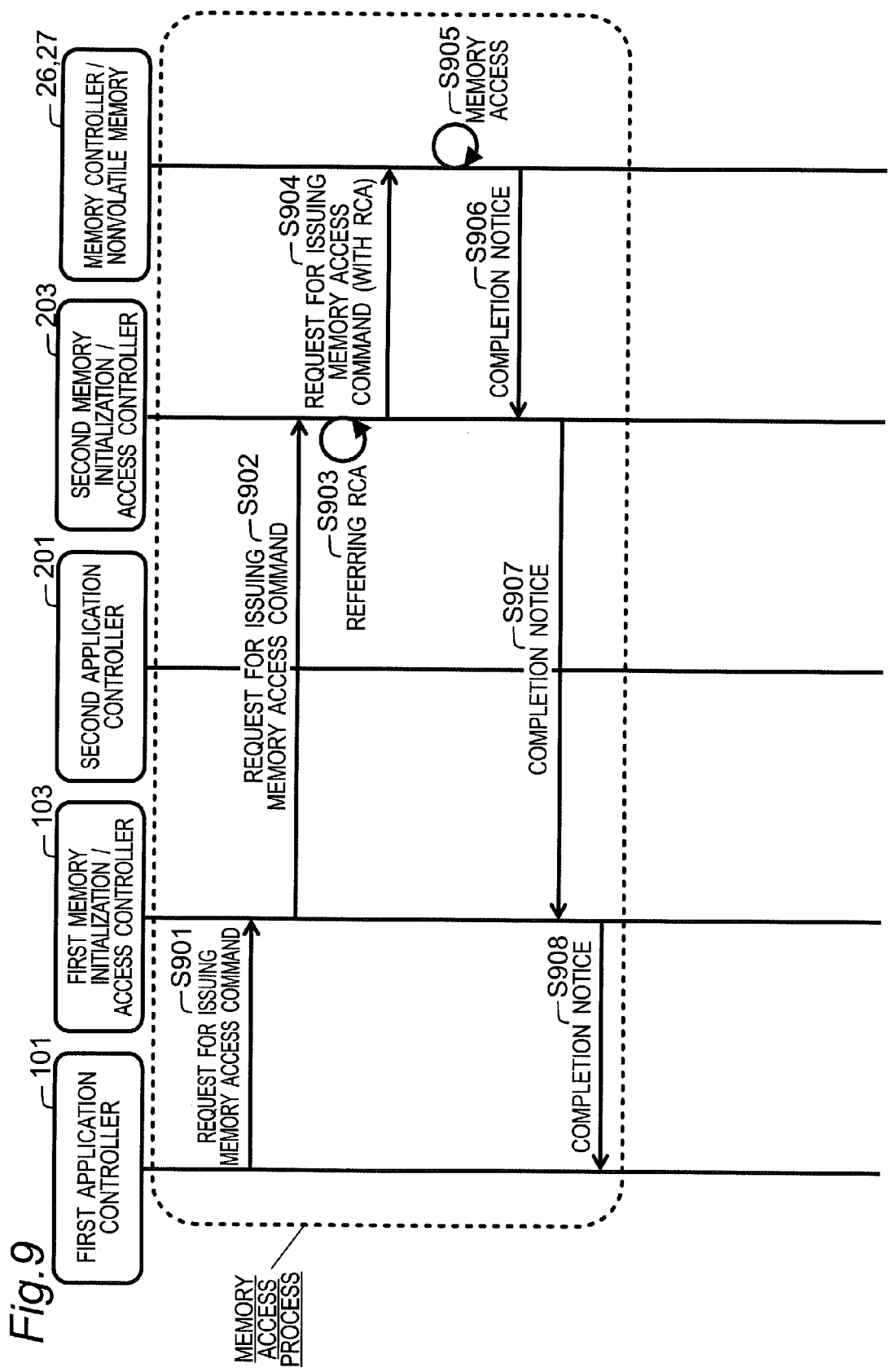

FUNCTIONAL DEVICE, ACCESS SYSTEM, AND COMMUNICATION ESTABLISHING METHOD

BACKGROUND

1. Technical Field

The present disclosure relates to a functional device that processes a predetermined function, and an access system including a functional device and an access apparatus that is connected to the functional device by communication and controls the functional device

2. Related Art

For recording media that store digital data such as music content and video data, there are various types such as magnetic disks, optical disks, and magneto-optical disks. Out of these recording media, a memory card that uses a semiconductor memory such as a flash memory as a recording element can achieve miniaturization of a recording medium, and thus, rapidly becomes popular mainly for compact portable devices such as digital still cameras and mobile phone terminals. Furthermore, recently, a semiconductor memory has started to be used not only for applications as removable media which can be removed such as conventional memory cards, but also for applications as device's built-in storage, e.g., a semiconductor memory such as a flash memory is built in a device and is used instead of a hard disk.

Meanwhile, due to the advances in wireless technology, the miniaturization, increase in functionality, and reduction in cost of LSIs for wireless such as 802.11 series, Bluetooth (registered trademark), are progressing. By this, wireless function has started to be provided to truly various terminals including not only mobile terminals such as mobile phones, Smartphones, and digital still cameras, but also stationary terminals such as TVs and hard disk recorders. As one application example thereof, there is proposed a memory card with wireless communication function where wireless function is provided to a conventional memory card (e.g., JP 2002-366919 A). The memory card with wireless function has the same interface shape as conventional type memory cards, and thus, can share an interface with a host device having a slot for conventional memory cards. Accordingly, without mounting hardware and software resources for wireless communication to the host device side, the memory card with wireless function can support wireless communication at low cost.

Conventionally, posting of still images to a web service or the like need to be performed by removing a memory card from a digital still camera and then placing the memory card in a PC or the like. However, placing the memory card with wireless function in a digital still camera, posting of still images to a web service or the like can be directly performed from the digital still camera. As such, the memory card with wireless function enables a host device to be easily connected to a network.

Furthermore, providing wireless communication function to a memory card also enables a use case in which memory cards are directly wirelessly connected to each other to exchange files therebetween. By this, for example, still images shot at an event such as a field day, a wedding, and so on can be handed over to a person right there, and thus pictures can be exchanged more easily.

Furthermore, there is proposed a method in which a memory card itself is provided with only wireless function and reading and writing of data are performed by accessing mass storage such as an external hard disk through wireless communication (e.g., Specification of US 2003/0018852 A). In this case, advantages that, for example, storage capacity can be easily added and a plurality of memory cards with wireless function can simultaneously access common storage can be received.

SUMMARY

Conventionally, a functional device having a predetermined function (e.g., a memory card) and an access apparatus (e.g., a personal computer) are directly connected to each other by an electrical wiring line or the like, and the functional device is controlled by the access apparatus. In the present disclosure, the case is described in which a functional device such as a memory card having, for example, wireless communication function as described above is controlled by an access apparatus connected to the functional device through, for example, wireless communication.

For example, storage with wireless function in which a wireless module and an SD card are mounted is used as a functional device, and an access apparatus that is wirelessly connected to the functional device is assumed. In this case, the access apparatus which is an access source transmits an arbitrary SD command including reading and writing of data, to the SD card in the storage with wireless function through wireless communication. At this time, prior to access to the SD card in the functional device, the access apparatus performs the same process as an initialization process which is conventionally performed on an SD card, on the SD card in the functional device through a wireless connection.

Herein, the case will be considered in which the connection between the access apparatus and the functional device which are wirelessly connected to each other is, for example, disconnected once, and the access apparatus and the functional device are reconnected thereafter. In this case, it is considered that even if the SD card in the functional device is actually the same one before and after the reconnection, the conventional access apparatus performs the same initialization process every time a reconnection is established.

Therefore, when a communication environment, such as a wireless connection, is unstable, a request for an SD card initialization process is frequently issued from the access apparatus which is an access source to the functional device including the storage with wireless function. The SD card initialization process takes a relatively long time. Thus, when a request for an initialization process is frequently issued upon wireless connection, a problem of an increase in the processing time required to establish a wireless connection occurs.

When a conventional access apparatus and a functional device are directly connected to each other through wired communication, since the communication between the access apparatus and the functional device has high reliability, a problem such as that described above does not is a big issue.

The present disclosure provides a technique for reducing the frequency of an initialization process or the like for a function provided to a functional device such as external storage, when an access apparatus accesses the functional device through, for example, wireless communication.

A functional device according to the present disclosure can communicate with an access apparatus through wireless communication. At least one additional device can be connected to the functional device. The functional device includes an access controller that performs an initialization process of the additional device to obtain characteristic information of the additional device from the additional device, before establishing communication between the access apparatus and the functional device, a memory that stores the obtained characteristic information, a communication unit that performs transmission and reception of data with the access apparatus, and a communication controller that transmits the characteristic information stored in the memory to the access apparatus without performing an initialization process of the additional device, upon establishment of communication with the access apparatus by the communication unit. When the additional device is a storage medium, the characteristic information includes at least one piece of capacity information indicating overall capacity of the additional device, memory state information indicating whether writing to the additional device is allowed, identifier information including an identifier identifying a type of the additional device, information of which value changes every time the initialization process is performed, and register information obtained from a value of a register of the additional device.

Further, An access system according to the present disclosure includes an access apparatus, and a functional device capable of communicating with the access apparatus through wireless communication. At least one additional device can be connected to the functional device. The access apparatus includes a first communication unit that performs data transmission and reception with the functional device through communication, a first communication controller that causes the first communication unit to establish communication with the functional device to obtain characteristic information of the additional device, a first memory that stores the characteristic information obtained by the first communication controller, and a first access controller that controls the additional device through the first communication unit, based on the characteristic information stored in the first memory. The functional device includes a second access controller that performs an initialization process of the additional device to obtain characteristic information of the additional device from the additional device, before establishing communication between the access apparatus and the functional device, a second memory that stores the characteristic information obtained by the second access controller, a second communication unit that performs transmission and reception of data with the access apparatus, and a second communication controller that transmits the characteristic information stored in the second memory to the access apparatus without performing an initialization process of the additional device, upon establishment of communication with the access apparatus by the second communication unit. When the additional device is a storage medium, the characteristic information includes at least one piece of capacity information indicating overall capacity of the additional device, memory state information indicating whether writing to the additional device is allowed, identifier information including an identifier identifying a type of the additional device, information of which value changes every time the initialization process is performed, and register information obtained from a value of a register of the additional device.

A communication establishing method according to the present disclosure used when a functional device capable of communicating with an access apparatus through wireless communication establishes communication between the functional device and the access apparatus. At least one additional device can be connected to the functional device. The method includes performing an initialization process of the additional device to obtain characteristic information of the additional device from the additional device, before establishing communication between the access apparatus and the functional device, storing the obtained characteristic information, performing transmission and reception of data with the access apparatus, and transmitting the stored characteristic information to the access apparatus without performing an initialization process of the additional device, upon establishment of communication with the access apparatus.

By the above, the idea of the present disclosure can suppress an unnecessary increase in the number of initialization processes or the like for a device function provided to the functional device, even when the access apparatus and the functional device are connected to each other through communication.

According to the idea of the present disclosure, when an access apparatus accesses a functional device such as external storage through a communication such as a wireless communication, the frequency of an initialization process or the like for a function provided to the functional device which are performed by the access apparatus can be reduced.

BRIEF DESCRIPTION OF DRAWINGS

FIG. 3 is a diagram showing one example of memory characteristic information according to the first embodiment.

FIG. 4 is a sequence diagram showing processing procedures of a memory initialization process by a wireless memory recording device according to the first embodiment.

FIG. 9 is a sequence diagram indicating procedures of a memory access process by a wireless memory recording device and a wireless memory access apparatus according to fourth embodiment.

DETAILED DESCRIPTION OF PREFERRED EMBODIMENTS

1. First Embodiment

Embodiments will be described below in detail with reference to drawings as necessary.

In the description of the present disclosure, certain unnecessary portions regarding, for example, conventional technology, redundant description on substantially the same configuration may be omitted for ease of description.

The following description and the attached drawings are disclosed to enable those skilled in the art to sufficiently understand the present disclosure, and are not intended to limit the subject matter of the claims.

1-1. Configuration of Access System

Figure 1:
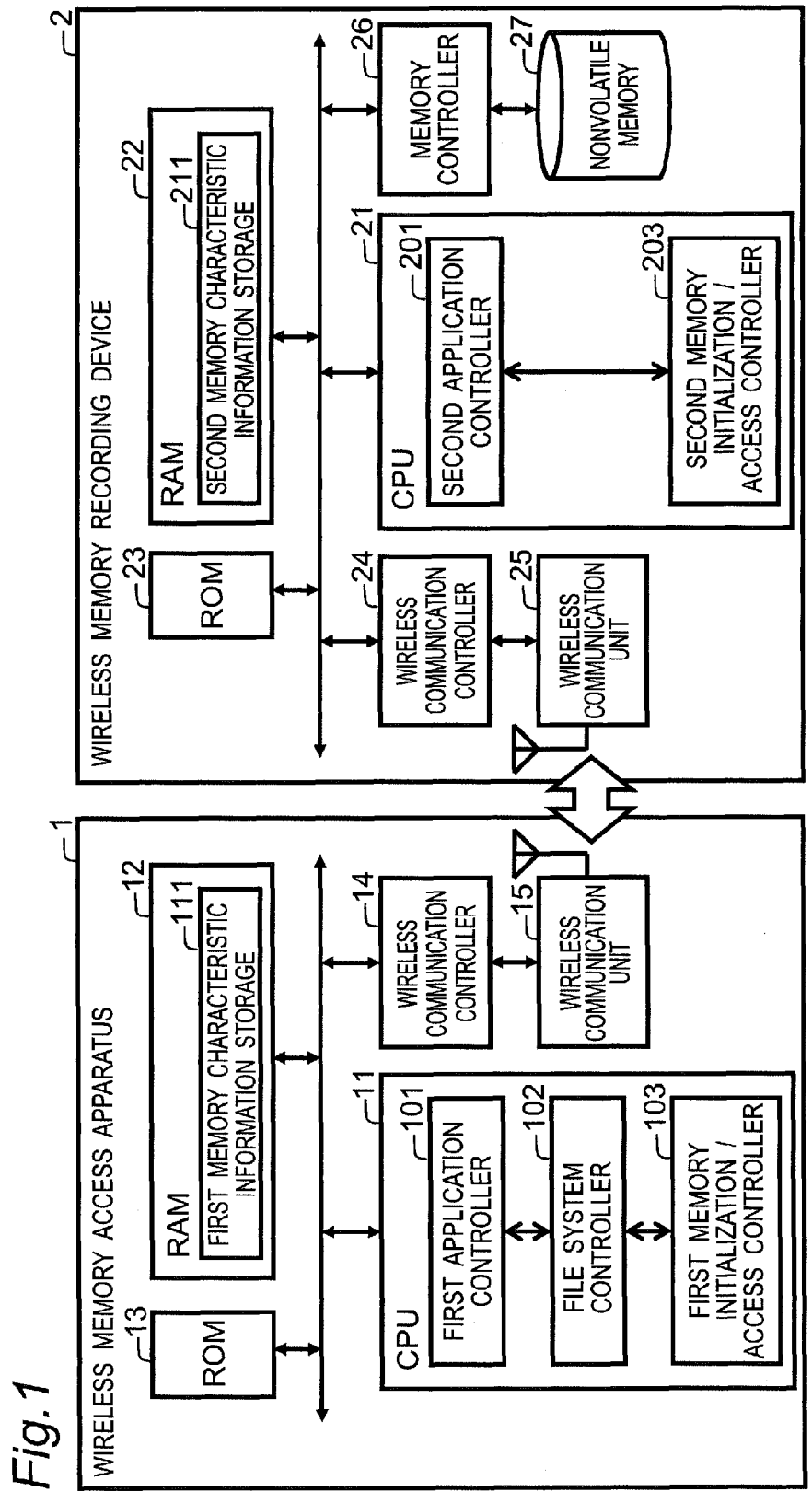
FIG. 1 is a diagram showing a configuration of an access system according to a first embodiment.

FIG. 1 is a diagram showing a configuration of an access system according to a first embodiment of the present disclosure. The access system includes a wireless memory access apparatus 1 which is an example of an access apparatus, and a wireless memory recording device 2 which is an example of a functional device. The wireless memory recording device 2 includes a nonvolatile memory 27 as an additional device. The additional device is a device that provides the functional device with a predetermined function.

As shown in FIG. 1, the wireless memory access apparatus 1 includes a CPU 11, a RAM 12, a ROM 13, a wireless communication controller 14, and a wireless communication unit 15.

The wireless communication controller 14 is a control unit that controls the wireless communication unit 15 to perform communication with the external wireless memory recording device 2. The types of wireless communications include, for example, 802.11a/b/g/n, Bluetooth, and the like. However, in the present embodiment, the type of wireless communication does not need to be limited to any specific wireless communication, and the idea of the present disclosure can be applied to any wireless communication. In addition, although in the present embodiment wireless communication is described as an example, the communication mode is not limited thereto. The wireless memory access apparatus 1 and the wireless memory recording device 2 may be connected to each other by wire or the like. That is, any implementation method can be used for a connection between the wireless memory access apparatus 1 and the wireless memory recording device 2, as long as the wireless memory access apparatus 1 and the wireless memory recording device 2 are connected in communication to each other.

The CPU 11 includes a first application controller 101, a file system controller 102, and a first memory initialization/access controller 103.

The ROM 13 stores therein programs that control the wireless memory access apparatus 1. The CPU 11 executes the programs stored in the ROM 13 using the RAM 12 as a temporary storage area, thereby implementing respective functions of the first application controller 101, the file system controller 102, and the first memory initialization/access controller 103.

The first application controller 101 performs overall control of the wireless memory access apparatus 1, such as generation of data, power control, and instructions for wireless connection/disconnection.

The file system controller 102 performs control for managing data as files by a file system such as the FAT file system. In the present embodiment, the file system controller 102 manages data in the nonvolatile memory 27 present in the wireless memory recording device 2. Note, however, that the file system controller 102 may be configured to also manage data in any nonvolatile memory or memory card in the wireless memory access apparatus 1 which is not shown. Namely, the file system controller 102 can manage storage (storage apparatuses), such as storage in the wireless memory access apparatus 1 and storage in the wireless memory recording device 2, in a common manner without being aware of differences, e.g., to which apparatus the storage is directly connected.

The first memory initialization/access controller 103 performs a process corresponding to a process that is performed by a memory card driver to issue various types of commands, such as read/write, to a memory card in a conventional host apparatus.

The RAM 12 includes a first memory characteristic information storage 111. The first memory characteristic information storage 111 stores information about the characteristics of the memory (hereinafter, referred to as "memory characteristic information") such as the capacity and register values of the nonvolatile memory 27 in the wireless memory recording device 2. Specific stored information, storage procedure, and reference procedure will be described later.

On the other hand, as shown in FIG. 1, the wireless memory recording device 2 includes a CPU 21, a RAM 22, a ROM 23, a wireless communication controller 24, a wireless communication unit 25, a memory controller 26, and the nonvolatile memory 27. The wireless memory recording device 2 is different from the configuration of the wireless memory access apparatus 1 in that the nonvolatile memory 27 composed of a flash memory or the like and the memory controller 26 that controls the nonvolatile memory 27 are included, and that the configurations of processing units included in the CPU 21 are different.

The wireless memory recording device 2 according to the present embodiment includes, as described previously, the nonvolatile memory 27 as an example of an additional device. The additional device is not limited to the nonvolatile memory 27 and may be an apparatus or module other than a nonvolatile memory (e.g., an apparatus having tuner function or an apparatus having communication function such as Bluetooth). The nonvolatile memory 27 may be composed of a built-in memory such as a flash memory, eMMC (embedded MMC), or eSD (embedded SD), or may be composed of a removable memory such as an SD card. Note that although in the present embodiment a configuration using an SD card is described as an example of the nonvolatile memory, the idea of the present disclosure is not limited thereto.

In the following, the case of accessing from the wireless memory access apparatus 1 to the nonvolatile memory 27 in the wireless memory recording device 2 will be assumed.

The ROM 23 stores therein programs for controlling the wireless memory recording device 2.

The CPU 21 includes a second application controller 201 and a second memory initialization/access controller 203. The CPU 21 executes the programs stored in the ROM 23, thereby implementing respective functions of the second application controller 201 and the second memory initialization/access controller 203.

The second application controller 201 performs overall control of the wireless memory recording device 2, such as power control and instructions for wireless connection/disconnection.

The second memory initialization/access controller 203 performs a process corresponding to a process that is performed by a memory card driver to issue various types of commands, such as read/write, to a memory card in a conventional host apparatus.

The RAM 22 includes a second memory characteristic information storage 211. The second memory characteristic information storage 211 stores information about the characteristics of the memory such as the capacity and register values of the nonvolatile memory 27 in the wireless memory recording device 2. Specific stored information, storage procedure, and reference procedure will be described later.

In the present embodiment, by the configuration of FIG. 1, a wireless connection between the wireless memory access apparatus 1 and the wireless memory recording device 2 is established, and the wireless memory access apparatus 1 accesses the nonvolatile memory 27 in the wireless memory recording device 2 through wireless communication. At that time, by using the first memory characteristic information storage 111 and the second memory characteristic information storage 211, a reduction in the frequency of an initialization process of the nonvolatile memory 27 and an increase in the speed of a connection process are achieved.

1-2. Transition of State of Wireless Memory Control System

Figure 2:
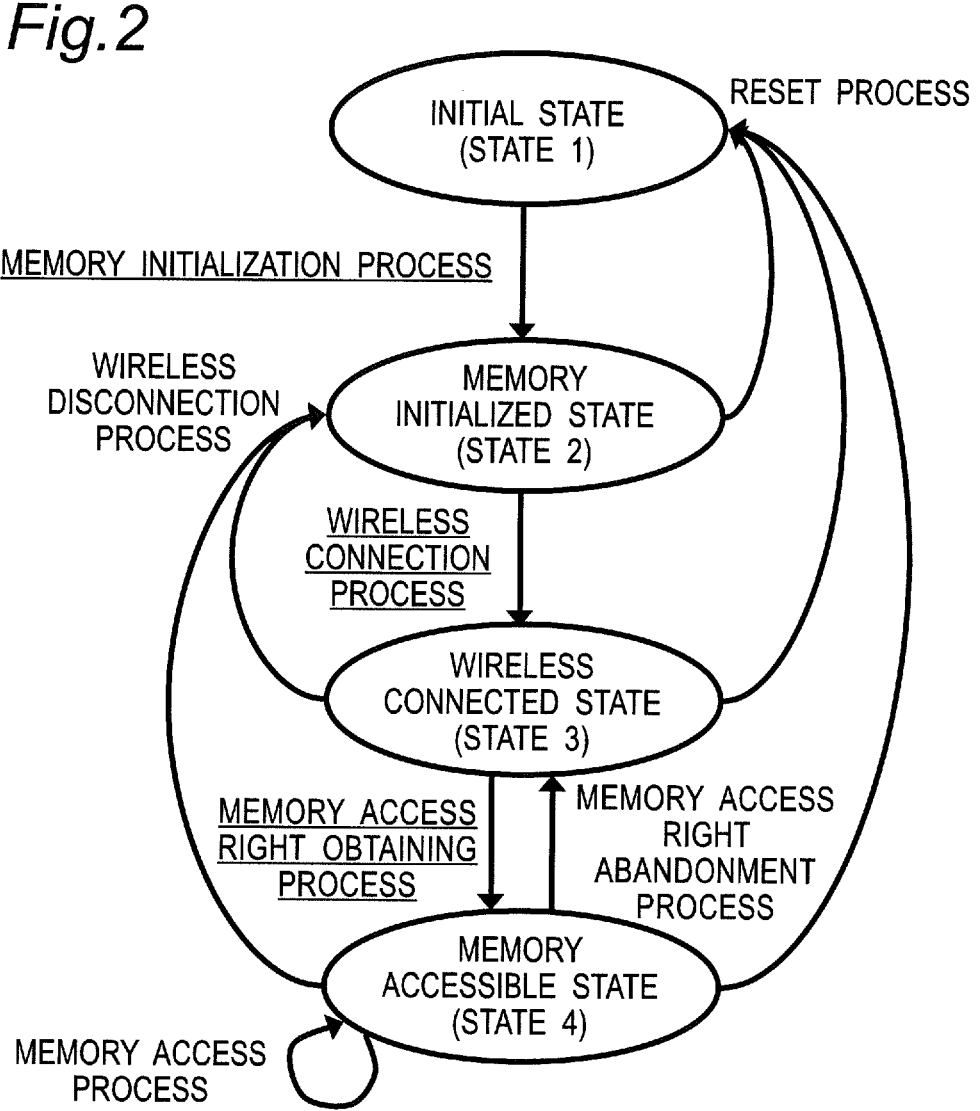
FIG. 2 is a state transition diagram of the access system according to the first embodiment.

FIG. 2 is a diagram showing the transition of the state of a wireless memory control system (access system) composed of the wireless memory access apparatus 1 and the wireless memory recording device 2 in the present embodiment. The wireless memory control system has four states, "initial state" (State 1), "memory initialized state" (State 2), "wireless connected state" (State 3), and "memory accessible state" (State 4), and transitions between the states.

(Initial state) The wireless memory control system according to the present embodiment goes to the "initial state" (State 1) immediately after the power to the wireless memory recording device 2 is turned on. This state is a state in which an initialization process of the nonvolatile memory 27 has not been performed and thus the nonvolatile memory 27 cannot be accessed, and is a state in which a wireless connection between the wireless memory access apparatus 1 and the wireless memory recording device 2 has not been established.

(Memory initialized state) When a "memory initialization process" is performed in the wireless memory recording device 2 in the "initial state" (State 1), the wireless memory control system transitions its state to the "memory initialized state" (State 2). This state (State 2) is a state in which the initialization process of the nonvolatile memory 27 in the wireless memory recording device 2 has been completed and thus the nonvolatile memory 27 can be accessed, but is a state in which a wireless connection between the wireless memory access apparatus 1 and the wireless memory recording device 2 has not been yet established. Note that the "memory initialization process" is the process of initializing the nonvolatile memory 27. Details of the "memory initialization process" will be described later.

(Wireless connected state) Furthermore, when a "wireless connection process" is performed between the wireless memory access apparatus 1 and the wireless memory recording device 2 in the "memory initialized state" (State 2), the wireless memory control system transitions its state to the "wireless connected state" (State 3). This state (State 3) is a state in which a wireless connection between the wireless memory access apparatus 1 and the wireless memory recording device 2 has been established, in addition to the state of the "memory initialized state" (State 2). However, this is a state in which the access right to the nonvolatile memory 27 in the wireless memory recording device 2 (hereinafter, referred to as the "memory access right") is stored on the side of the wireless memory recording device 2, and thus, the wireless memory access apparatus 1 cannot access the nonvolatile memory 27. Note that the "wireless connection process" is a process related to a connection between the wireless memory access apparatus 1 and the wireless memory recording device 2 through a wireless line. Details of the "wireless connection process" will be described later.

(Memory accessible state) Subsequently, when a "memory access right obtaining process" is performed in this state (State 3), the wireless memory control system transitions its state to the "memory accessible state" (State 4). Only after the wireless memory control system goes into this state (State 4), the wireless memory access apparatus 1 is allowed to access the nonvolatile memory 27 in the wireless memory recording device 2 ("memory access process"). The "memory access right obtaining process" is a process for obtaining the memory access right to the nonvolatile memory 27. Details of the "memory access right obtaining process" will be described later.

In addition, in the "memory accessible state" (State 4), when the wireless memory access apparatus 1 does not need to have the access right to the nonvolatile memory 27 and thus the wireless memory access apparatus 1 abandons the access right ("memory access right abandonment process"), the wireless memory control system transitions its state to the "wireless connected state" (State 3).

Furthermore, when the wireless communication is disconnected ("wireless disconnection process") in the state of the "wireless connected state" (State 3) or the "memory accessible state" (State 4), the wireless memory control system transitions to the state of the "memory initialized state" (State 2).

Furthermore, in the state of the "memory initialized state" (State 2), the "wireless connected state" (State 3), or the "memory accessible state" (State 4), when the nonvolatile memory 27 is reset or the nonvolatile memory 27 is removed and inserted in the case of the nonvolatile memory 27 being a removable memory ("reset process"), the wireless memory control system transitions to the "initial state" (State 1).

1-3. Memory Characteristic Information

Next, memory characteristic information stored in the first memory characteristic information storage 111 and the second memory characteristic information storage 211 according to the present embodiment will be described. FIG. 3 is a diagram showing an example of memory characteristic information according to the first embodiment.

The memory characteristic information is information indicating various characteristics of the nonvolatile memory 27 or the like. The memory characteristic information is classified into several types, from general information to detailed information. In the example shown in FIG. 3, the general information includes "capacity information", "memory state", and "identifier". In addition, the detailed information includes "register".

Note that, in the present embodiment, a nonvolatile memory is described as an example of the functional device. Hence, here, although the "memory characteristic information" is described as information about the characteristics of the functional device, the idea of the present disclosure is not limited thereto. That is, the information used in the wireless memory control system is not limited to memory characteristic information. In the case of a functional device having other functions, too, information indicating various characteristics of the respective functions can be used as "characteristic information".

The "capacity information" includes information that is required when managing a storage apparatus such as an SD memory card. Specifically, the "capacity information" includes information such as "total capacity" indicating the overall capacity of the nonvolatile memory 27, "sector size" which is the size of the minimum access unit of the nonvolatile memory 27, and "erase block size" which is the size of a minimum erase unit in the case of the nonvolatile memory 27 being a NAND-type flash memory.

The "memory state" includes information about the state of the non-volatile memory 27 at the present time. Specifically, the "memory state" includes "write protect state", "lock state", "memory type", "bus type", and "IO support state". The "write protect state" is information indicating the set state of a write protect switch which is a physical switch in the case of the nonvolatile memory 27 being a removable memory such as an SD card, and which is used to switch whether to allow writing to the nonvolatile memory 27. The "lock state" is information indicating whether the nonvolatile memory 27 is set to a lock state where the nonvolatile memory 27 is not allowed to be accessed, by password protection. The "memory type" is information indicating which one of RAM (readable/writable state), ROM (read only state), OTP (One Time Programmable: one-time writable state), and the like, the type of the nonvolatile memory 27 is. The "bus type" is information indicating the state of the speed of a bus which occurs due to the difference in clock frequency or transfer mode inputted to a bus that is used to access the nonvolatile memory 27. The "IO support state" includes information indicating, for example, whether the nonvolatile memory 27 provides only a simple memory function, provides an IO function such as wireless, or the like.

The "identifier" includes information for identifying each individual nonvolatile memory 27 such as an SD card. Specifically, the "identifier" includes "vendor ID", "serial number", and "memory identifier". The "vendor ID" is information identifying a manufacturing vendor of the nonvolatile memory 27. The "serial number" is information identifying each individual nonvolatile memory 27. The "memory identifier" is information identifying the nonvolatile memory 27, such as LUN (Logical Unit Number) for a USB device or RCA (Relative Card Address) for an SD card.

Most of the information included in the memory characteristic information is generated based on the resister values of the nonvolatile memory 27 such as an SD card, based on detailed information which is obtained from the states of electrical wiring lines which are connection interfaces with the nonvolatile memory 27, or the like. These pieces of generated information is information that indicates the general description of the nonvolatile memory 27 and that is mainly used by the wireless memory access apparatus 1 to recognize the rough features and characteristics of the nonvolatile memory 27.

On the other hand, the "register" includes detailed characteristic information of the nonvolatile memory 27 which is directly obtained from the nonvolatile memory 27. The "register" includes information such as "register for storing IDs", "memory characteristic information register", "status information register", "voltage control register", "memory identifier register", and so on.

The "register for storing IDs" is information including various types of ID information including a vendor ID, a serial number, and so on. In the case of an SD card, the "register for storing IDs" corresponds to the CID register.

The "memory characteristic information register" is information about the general characteristics of the nonvolatile memory 27, such as capacity and timing specifications. In the case of an SD card, the "memory characteristic information register" corresponds to the CSD register and the SD Status.

The "status information register" is information about the current state of the nonvolatile memory 27, such as lock state. In the case of an SD card, the "status information register" corresponds to the R1 response. The R1 response itself is not a register, but is information that can be directly obtained from the SD card in response after issuing a command to the SD card. Thus, in the present embodiment, the "status information register" is treated as a kind of register. Namely, in the present embodiment, the "register" is such information that is directly obtained from the nonvolatile memory 27.

In addition, the "voltage control register" is information about operating voltage. In the case of an SD card, the "voltage control register" corresponds to the OCR register.

The "memory identifier register" is information identifying the nonvolatile memory 27. In the case of an SD card, the "memory identifier register" corresponds to the RCA. The RCA itself is not originally a register, either, but is treated as a kind of register in the present embodiment based on the above-described definition. The value of the RCA changes every time an initialization process of the nonvolatile memory 27 is performed.

Most of the memory characteristic information is obtained from the nonvolatile memory 27 as part of an initialization process of the nonvolatile memory 27. Normally, the memory characteristic information is transmitted to the access apparatus side, in response to the issue of various types of commands and read data in a memory initialization process. The present embodiment proposes a method of further shortening or reducing a memory initialization process by devising the obtaining timing, method of use, or the like, of the memory characteristic information. Hence, in the following description of the present embodiment, the obtaining timing, method of use, or the like, of the memory characteristic information will be described in detail using various sequence diagrams.

The present embodiment characterized by each of the processes from the initialization of the nonvolatile memory 27 to actual access to the nonvolatile memory 27 by the wireless memory access apparatus 1. Thus, in the following, the process from the initialization of the nonvolatile memory 27 to actual access to the nonvolatile memory 27 by the wireless memory access apparatus 1 is divided into processes, a "memory initialization process", a "wireless connection process", a "memory access right obtaining process", and a "memory access process", and the respective processes will be described in detail using various sequence diagrams.

1-4. Memory Initialization Process

FIG. 4 is a sequence diagram showing the processing procedure of a "memory initialization process" according to the present embodiment. The "memory initialization process" includes processes up to the point where an initialization process of the nonvolatile memory 27 is performed in the wireless memory recording device 2, thereby going to a state in which the second application controller 201 in the wireless memory recording device 2 is allowed to access the nonvolatile memory 27. A specific processing procedure is as follows.

(S401) At timing at which, for example, the power to the wireless memory recording device 2 is turned on the nonvolatile memory 27 is placed, or the like, a memory initialization event occurs for the second memory initialization/access controller 203. By the occurrence of the memory initialization event, the second memory initialization/access controller 203 requests the memory controller 26 to initialize the nonvolatile memory 27. That is, the second memory initialization/access controller 203 requests the memory controller 26 to initialize the nonvolatile memory 27, independently of an initialization request from the wireless memory access apparatus 1.

(S402) The memory controller 26 performs an initialization process on the nonvolatile memory 27 (memory initialization process). In the case of the nonvolatile memory 27 being an SD card, specifically, initialization commands such as CMD0, ACMD41, CMD2, and CMD3 are issued in practice to perform an initialization process.

(S403) When the memory initialization process has been completed, the memory controller 26 notifies the second memory initialization/access controller 203 of the completion of the initialization process. At this time, the memory controller 26 transmits memory characteristic information described in FIG. 3 to the second memory initialization/access controller 203. In the case of the nonvolatile memory 27 being an SD card, specifically, CID register, CSD register, SD Status, R1 response, OCR register, RCA, and so on are transmitted to the second memory initialization/access controller 203. Since these pieces of information are information to be obtained from the SD card upon initialization of the SD card, these pieces of information are obtained from the SD card at the time of this memory initialization process and are transmitted to the second memory initialization/access controller 203.

(S404) The second memory initialization/access controller 203 stores the transmitted memory characteristic information in the second memory characteristic information storage 211. At this time, the second memory initialization/access controller 203 may convert the information that is transmitted from the memory controller 26 as registers into general information such as capacity information, and store the general information.

(S405) Finally, the second memory initialization/access controller 203 notifies the second application controller 201 of the completion of preparation for access to the nonvolatile memory 27. The notification of the completion of preparation for access is also a notification allowing to access the nonvolatile memory 27. By this, the second application controller 201 is thereafter allowed to access the nonvolatile memory 27.

At this point in time, only the wireless memory recording device 2 can access the nonvolatile memory 27 (writing and reading of data, and so on) and the wireless memory access apparatus 1 cannot access the nonvolatile memory 27. By the processes at steps S401 to S405, the wireless memory control system transitions its state from the "initial state" (State 1) to the "memory initialized state" (State 2) shown in FIG. 2.

1-5. Wireless Connection Process and Memory Access Right Obtaining Process

Next, the processing procedures of a "wireless connection process" and a "memory access right obtaining process" according to the present embodiment will be described using FIG. 5.

The "wireless connection process" includes an arbitration process for establishing a wireless connection between the wireless memory access apparatus 1 and the wireless memory recording device 2. In addition, the "memory access right obtaining process" is the process of obtaining, by the wireless memory access apparatus 1, the access right to the nonvolatile memory 27 from the wireless memory recording device 2. Namely, the "memory access right obtaining process" is the process of transferring the access right from the wireless memory recording device 2 to the wireless memory access apparatus 1. By transferring the access right, access to the nonvolatile memory 27 from the wireless memory recording device 2 with no access right is disabled. By this, competition of access to the nonvolatile memory 27 is avoided, and thus preventing data corruption on the nonvolatile memory 27 caused by access competition.

(S500) The first application controller 101 in the wireless memory access apparatus 1 transmits a request for wireless connection preparation to the second application controller 201 in the wireless memory recording device 2. Here, the request for the wireless connection preparation is, for example, a request for a session start. When the wireless memory recording device 2 is not activated, the wireless memory recording device 2 does not respond to the request for the wireless connection preparation.

(S501) When receiving the request for the wireless connection preparation from the first application controller 101 in the wireless memory access apparatus 1 after completion of the "memory initialization process", the second application controller 201 in the wireless memory recording device 2 notifies the first application controller 101 in the wireless memory access apparatus 1 that wireless connection preparation has been made. By this, the wireless memory access apparatus 1 recognizes that the wireless memory access apparatus 1 can start a request to establish a wireless connection with the wireless memory recording device 2. Note, however, that this notification process is not necessarily required, and the process of notifying that wireless connection preparation has been made may be omitted when, for example, the wireless memory access apparatus 1 checks on the wireless memory recording device 2 by polling whether a request to establish a wireless connection can be made.

(S502) When the first application controller 101 in the wireless memory access apparatus 1 is notified from the second application controller 201 that the wireless connection preparation has been made, the first application controller 101 transmits a request for establishing a wireless connection between the wireless memory access apparatus 1 and the wireless memory recording device 2 (hereinafter, referred to as a "request for wireless connection establishment") to the second application controller 201 in the wireless memory recording device 2.

(S503) When receiving the request for the wireless connection establishment from the first application controller 101, the second application controller 201 issues a request for obtaining memory characteristic information (hereinafter, also referred to as a "request for obtaining memory characteristic information") instead of issuing a memory initialization request, to the second memory initialization/access controller 203.

(S504) The second memory initialization/access controller 203 refers to the memory characteristic information stored in the second memory characteristic information storage 211 in the RAM 22. The second memory characteristic information storage 211 has the memory characteristic information stored therein by the aforementioned processes at steps S401 to S405.

(S505) The second memory initialization/access controller 203 transmits the referred memory characteristic information to the second application controller 201.

(S506) When the second application controller 201 in the wireless memory recording device 2 obtains the memory characteristic information from the second memory initialization/access controller 203, the second application controller 201 notifies the first application controller 101 in the wireless memory access apparatus 1 of the completion of establishment of a wireless connection, and also transmits the obtained memory characteristic information to the first application controller 101, by which the wireless connection process ends.

The processes (S500 to S506) up to this point are the "wireless connection process". By the "wireless connection process", the wireless memory control system transitions its state from the "memory initialized state" (State 2) to the "wireless connected state" (State 3) shown in FIG. 2. By the "wireless connection process", the wireless memory access apparatus 1 is allowed to receive the memory characteristic information in the wireless memory recording device 2 which is connected in communication thereto, from the wireless memory recording device 2 through wireless communication.

Next, the processing procedure of a "memory access right obtaining process" will be described.

(S507) The first application controller 101 in the wireless memory access apparatus 1 requests for a memory access right to the nonvolatile memory 27 from the second application controller 201 in the wireless memory recording device 2.

(S508) When the second application controller 201 in the wireless memory recording device 2 is requested for the memory access right, the second application controller 201 performs a process required to pass the access right to the nonvolatile memory 27 which is stored thereby, to the wireless memory access apparatus 1. Thereafter, the second application controller 201 notifies the first application controller 101 in the wireless memory access apparatus 1 of the completion of the process for the access right request.

Here, the "process required" is, for example, a process in which an unmount process of the nonvolatile memory 27 is instructed to a file system controller which is not shown in the wireless memory recording device 2, to set the wireless memory recording device 2 to a state in which all applications in the wireless memory recording device 2 are not allowed to perform reading or writing to the nonvolatile memory 27. Namely, in order to pass the access right to the nonvolatile memory 27 from the wireless memory recording device 2 to the wireless memory access apparatus 1, the wireless memory recording device 2 performs the process of shutting down access to the nonvolatile memory 27 from within the wireless memory recording device 2.

(S509) When the first application controller 101 is notified from the second application controller 201 of the completion of the process for the request for obtaining access right, the first application controller 101 transmits the obtained memory characteristic information to the first memory initialization/access controller 103 and instructs the first memory initialization/access controller 103 to store necessary information out of information included in the memory characteristic information.

(S510) The first memory initialization/access controller 103 stores the memory characteristic information transmitted from the first application controller 101, in the first memory characteristic information storage 111.

(S511) Finally, the first memory initialization/access controller 103 notifies the first application controller 101 of the completion of storage of the memory characteristic information, by which the memory access right obtaining process ends.

When the memory access right obtaining process ends, the wireless memory control system transitions its state from the "wireless connected state" (State 3) to the "memory accessible state" (State 4) shown in FIG. 2.

By the "memory access right obtaining process", the wireless memory access apparatus 1 can store the memory characteristic information of the nonvolatile memory 27 connected to the wireless memory recording device 2, instead of memory characteristic information that is conventionally obtained by a card driver of the wireless memory access apparatus 1 in a memory initialization process. Hence, by the two processes, "wireless connection process" and "memory access right obtaining process", the wireless memory access apparatus 1 can rapidly implement a connection process (a process corresponding to an initialization process) without performing a memory initialization process of the nonvolatile memory 27 itself.

1-6. Memory Access Process

Figure 6:
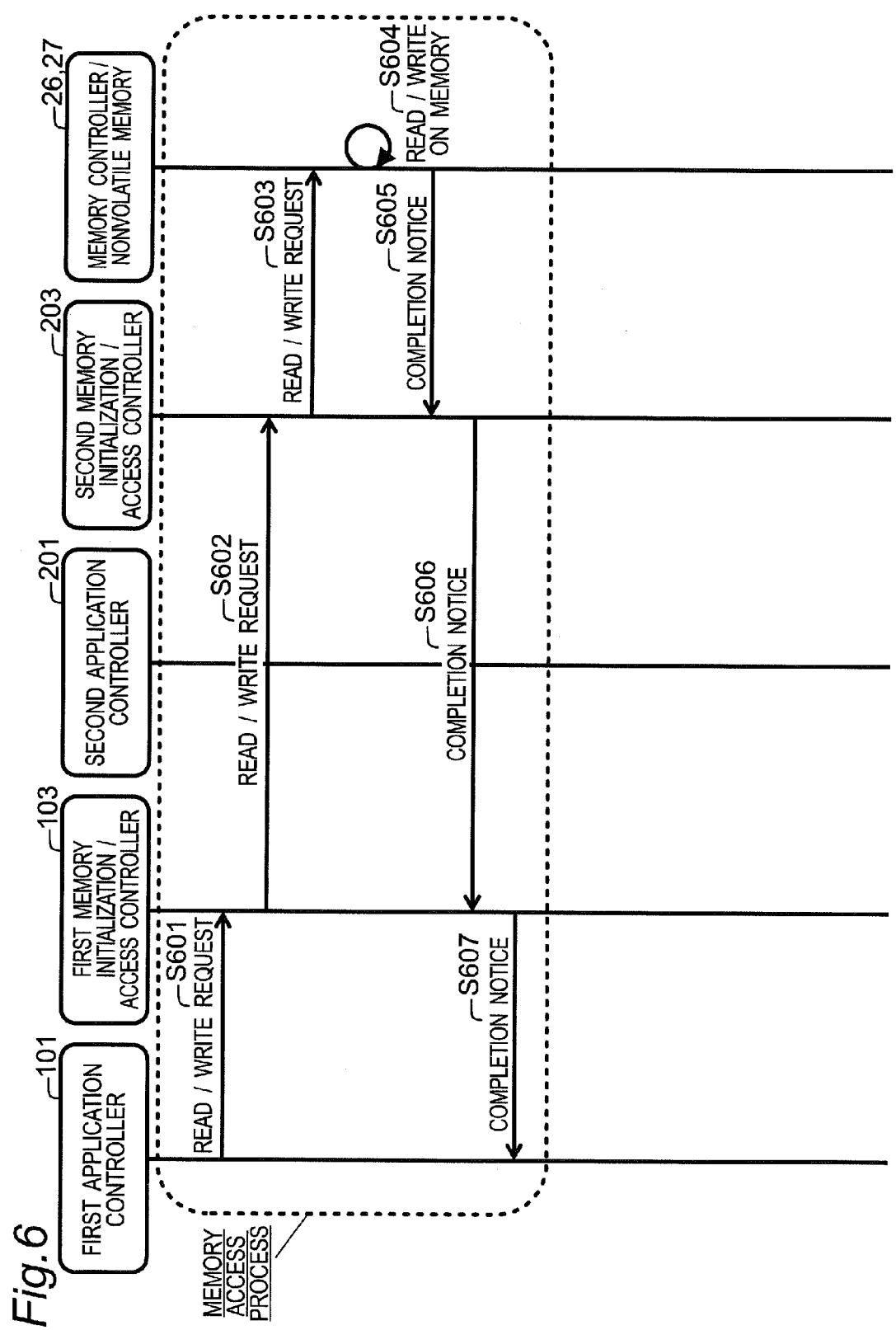
FIG. 6 is a sequence diagram indicating procedures of a memory access process by the wireless memory recording device and the wireless memory access apparatus according to the first embodiment.

Next, the processing procedure of a "memory access process" in the present embodiment will be described using FIG. 6.

(S601) The first application controller 101 requests, via the file system controller 102, the first memory initialization/access controller 103 to perform a read/write process on the nonvolatile memory 27.

(S602) The first memory initialization/access controller 103 in the wireless memory access apparatus 1 requests the second memory initialization/access controller 203 in the wireless memory recording device 2 to perform the read/write process on the nonvolatile memory 27.

(S603) When the second memory initialization/access controller 203 is requested by the first memory initialization/access controller 103 for the read/write process, the second memory initialization/access controller 203 requests the memory controller 26 to perform the read/write process on the nonvolatile memory 27.

(S604) When the memory controller 26 is requested by the second memory initialization/access controller 203 for a read/write process, the memory controller 26 performs the read/write process on the nonvolatile memory 27 in practice.

(S605) When the memory controller 26 has completed the read/write process on the nonvolatile memory 27, the memory controller 26 notifies the second memory initialization/access controller 203 of the completion of the process.

(S606) When the second memory initialization/access controller 203 in the wireless memory recording device 2 is notified from the memory controller 26 about the completion of the process, the second memory initialization/access controller 203 notifies the first memory initialization/access controller 103 in the wireless memory access apparatus 1 of the completion of the process.

(S607) When the first memory initialization/access controller 103 is notified from the second memory initialization/access controller 203 about the completion of the process, the first memory initialization/access controller 103 notifies the first application controller 101 of the completion of the process.

The "memory access process" is substantially the same process as a conventional process in which an arbitrary application issues a read/write request to a card driver via a file system to perform a read/write process. Namely, after performing the "wireless connection process" and the "memory access right obtaining process" in the present embodiment, memory access can be implemented by a common process to a conventional memory access process.

As described above, by using the wireless memory recording device 2 and the wireless memory access apparatus 1 according to the present embodiment in combination, when accessing a nonvolatile memory 27 through wireless communication, it is unnecessary to perform an initialization process of the nonvolatile memory 27 every time a connection establishment process is performed. Thus, a connection establishment process can be performed rapidly. The art described in the present embodiment provides a great effect particularly when applied to the case in which a reconnection process frequently occurs in an environment where a wireless connection is unstable.

1-8. Conclusion of the Present Embodiment

As described above, the wireless memory recording device 2 according to the present embodiment can communicate with the wireless memory access apparatus 1 through wireless communication. At least one additional device can be connected to the wireless memory recording device 2. The wireless memory recording device 2 includes the second memory initialization/access controller 203 that performs an initialization process of the additional device to obtain characteristic information of the additional device from the additional device, before establishing communication between the wireless memory access apparatus 1 and the wireless memory recording device 2; the second memory characteristic information storage 211 that stores the obtained characteristic information; the wireless communication unit 25 that performs transmission and reception of data with the wireless memory access apparatus 1; and the second application controller 201 that transmits the characteristic information stored in the second memory characteristic information storage 211 to the wireless memory access apparatus 1 without performing an initialization process of the additional device, upon establishment of communication with the wireless memory access apparatus 1 by the wireless communication unit 25.

When the additional device is a storage medium, the characteristic information includes at least one piece of capacity information indicating the overall capacity of the additional device, memory state information indicating whether writing to the additional device is allowed, identifier information including an identifier identifying the type of the additional device, information of which value changes every time an initialization process is performed, and register information obtained from the value of a register of the additional device.

When the wireless memory recording device 2 having the above-described configuration establishes a connection with the wireless memory access apparatus 1, the wireless memory recording device 2 transmits the memory characteristic information stored in the second memory characteristic information storage 211 to the wireless memory access apparatus 1, without initializing the nonvolatile memory 27. By this, an unnecessary increase in the number of initialization processes on the nonvolatile memory 27 can be suppressed. Thus, establishment of a connection between the wireless memory access apparatus 1 and the wireless memory recording device 2 can be speeded up.

2. Second Embodiment

Next, a second embodiment in the present disclosure will be described. The present embodiment is different from the first embodiment in the processing procedure of a "wireless connection process". The configuration and processes of a wireless memory control system other than the processing procedure of a "wireless connection process" are the same as those in the first embodiment. Hence, in the present embodiment, only the processing procedure of a "wireless connection process" is described, and description of other configurations and processing procedures is omitted.

Figure 7:
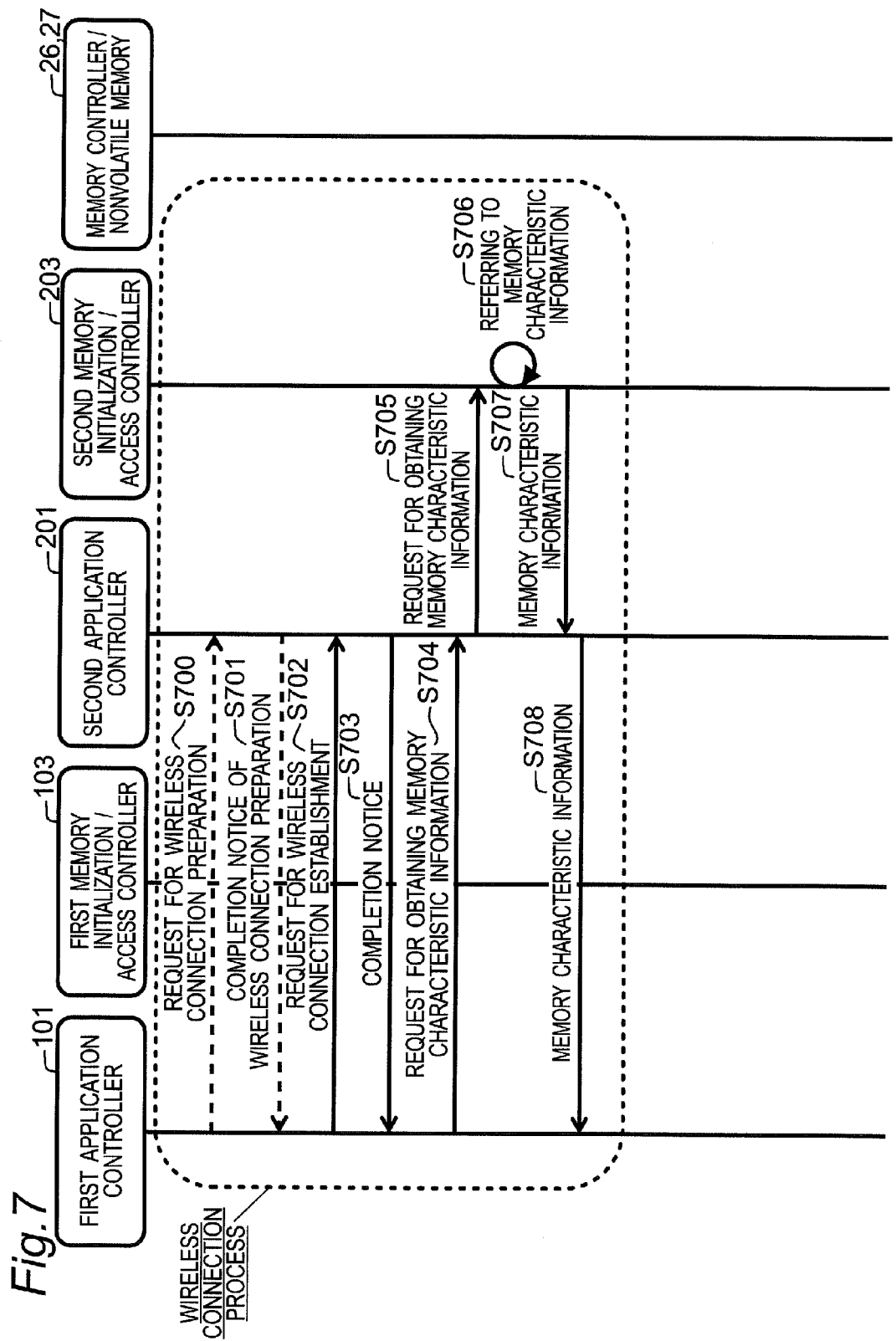
FIG. 7 is a sequence diagram indicating procedures of a wireless connection process by a wireless memory recording device and a wireless memory access apparatus according to a second embodiment.

FIG. 7 is a sequence diagram showing the processing procedure of a "wireless connection process" in the present embodiment. In the present embodiment, the timing of a request for obtaining memory characteristic information in the "wireless connection process" is different from that in the first embodiment. A specific processing procedure of the "wireless connection process" in the present embodiment is as follows.

(S700) The first application controller 101 in the wireless memory access apparatus 1 transmits a request of a wireless connection preparation to the second application controller 201 in the wireless memory recording device 2. When the wireless memory recording device 2 is not activated, the wireless memory recording device 2 does not respond to the request of the wireless connection preparation (S701) When the wireless memory recording device 2 receives the request of the wireless connection preparation after the activation of the wireless memory recording device 2 and completion of a "memory initialization process", the second application controller 201 in the wireless memory recording device 2 notifies the first application controller 101 in the wireless memory access apparatus 1 that wireless connection preparation has been completed. By this, the wireless memory access apparatus 1 recognizes that the wireless memory access apparatus 1 can start to request for wireless connection establishment to the wireless memory recording device 2.

(S702) When the first application controller 101 in the wireless memory access apparatus 1 is notified from the second application controller 201 that wireless connection preparation has been completed, the first application controller 101 transmits a request of wireless connection establishment to the second application controller 201 in the wireless memory recording device 2.

(S703) When the second application controller 201 in the wireless memory recording device 2 receives the request of the wireless connection establishment, the second application controller 201 performs a process for establishing a wireless connection and then notifies the first application controller 101 in the wireless memory access apparatus 1 of the completion of the wireless connection establishment. In the present embodiment, at this time point since only a wireless connection has been established, and memory characteristic information is not transmitted to the first application controller 101.

(S704) After notified from the second application controller 201 about the completion of the wireless connection establishment, the first application controller 101 in the wireless memory access apparatus 1 transmits a request for obtaining memory characteristic information to the second application controller 201 in the wireless memory recording device 2.

(S705) When receiving the request for obtaining the memory characteristic information, the second application controller 201 transmits a request for obtaining memory characteristic information instead of transmitting a request for a memory initialization, to a second memory initialization/access controller 203.

(S706) When receiving the request for obtaining the memory characteristic information from the second application controller 201, the second memory initialization/access controller 203 refers to memory characteristic information stored in the second memory characteristic information storage 211 in the RAM 22.

(S707) The second memory initialization/access controller 203 transmits the referred memory characteristic information to the second application controller 201.

(S708) The second application controller 201 in the wireless memory recording device 2 transmits the obtained memory characteristic information to the first application controller 101 in the wireless memory access apparatus 1, by which the wireless connection process ends.

Figure 5:
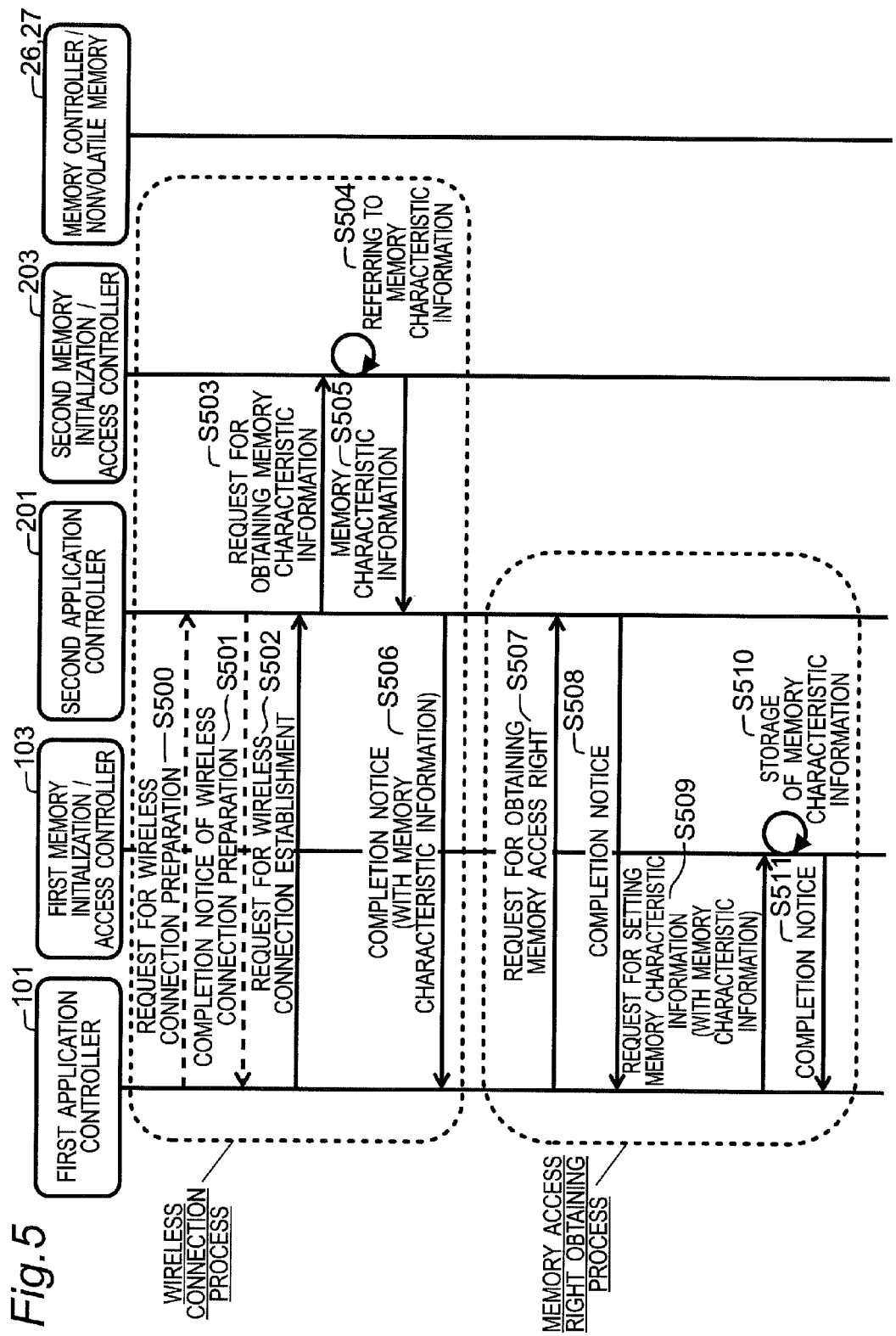
FIG. 5 is a sequence diagram indicating procedures of a wireless connection process and a memory access right obtaining process by the wireless memory recording device and a wireless memory access apparatus according to the first embodiment.

The wireless connection process according to the present embodiment shown in FIG. 7 is different from the wireless connection process according to the first embodiment shown in FIG. 5 in whether obtaining of memory characteristic information is performed to be included in a process for a request for wireless connection establishment (first embodiment) or obtaining of memory characteristic information is requested from the wireless memory access apparatus 1 to the wireless memory recording device 2 after a request for wireless connection establishment, as a request independent of the request for the wireless connection establishment (the present embodiment). As such, a memory characteristic information obtaining process may be included in a request for wireless connection establishment, or may be performed as a process independent of a request for wireless connection establishment.

Furthermore, a request for obtaining memory characteristic information described in FIG. 7 does not need to be completed in one process, and may be performed to be divided into a plurality of processes. Specifically, in a request for obtaining memory characteristic information at step S704, the first application controller 101 specifies memory characteristic information which is an obtaining target and requests the second application controller 201 to obtain memory characteristic information. That is, the first application controller 101 requests for a part of the memory characteristic information shown in FIG. 3. In addition, as necessary, the first application controller 101 requests the second application controller 201 a plurality of times to obtain memory characteristic information, while changing the specification of memory characteristic information which is an obtaining target. By doing so, the first application controller 101 can request the second application controller 201 for only memory characteristic information that is required by the first application controller 101, and thus, unnecessary memory characteristic information does not need to be obtained.

This method is particularly effective when applied to the case in which there is a large amount of memory characteristic information which is an obtaining target, or the case in which there are many nonvolatile memories which are obtaining targets (i.e., the case in which there are a plurality of nonvolatile memories 27 in the wireless memory recording device 2).

In addition, this method according to the present embodiment can be applied to the following case. In the case of the nonvolatile memory 27 being an SD card, to obtain various types of registers (CID register, CSD register, and so on) which are memory characteristic information, there is a need to issue individual commands to the SD card. Hence, the wireless memory access apparatus 1 issues instructions corresponding to various types of commands to the wireless memory recording device 2, to obtain register information individually. In this case, when the second memory initialization/access controller 203 receives an instruction to obtain a register, in practice, the second memory initialization/access controller 203 has already obtained memory characteristic information from the nonvolatile memory 27 and has already stored the memory characteristic information in the RAM 22. Thus, when the second memory initialization/access controller 203 receives an instruction to obtain a register, in practice, the second memory initialization/access controller 203 refers to the memory characteristic information stored in the second memory characteristic information storage 211 in the RAM 22, without issuing a command for obtaining a register to the nonvolatile memory 27. By this, obtaining of the register can be performed. The method according to the present embodiment can be also applied to such a case.

As described above, in the present embodiment, separating a request for wireless connection establishment and a request for obtaining memory characteristic information from each other enables memory characteristic information to be efficiently obtained from the wireless memory recording device 2.

Note that the configurations of the wireless memory recording device 2 and the wireless memory access apparatus 1 described in the present embodiment are an example, and thus may be modified without departing from the spirit and scope of the present embodiment. For example, various variants described in the first embodiment or arts described in other embodiments may be applied to the present embodiment.

In addition, the process for a request for obtaining memory characteristic information described in FIG. 7 needs to be performed before performing a "memory access process" in practice. Hence, in the present embodiment, a request for obtaining memory characteristic information is performed between a request for wireless connection establishment and a request for obtaining memory access right However, a request for obtaining memory characteristic information may be performed between a request for obtaining memory access right and a "memory access process". Even if the processing procedure is thus changed, at the time of performing a "memory access process", the wireless memory access apparatus 1 has already obtained memory characteristic information. Thus, the wireless memory access apparatus 1 can perform a "memory access process".

3. Third Embodiment

Next, a third embodiment in the present disclosure will be described. The present embodiment is different from the first embodiment in the processing procedure of a "memory access process". The configuration and processes of a wireless memory control system other than the processing procedure of a "memory access process" are the same as those in the first embodiment. Hence, in the present embodiment, only the processing procedure of a "memory access process" is described, and description of other configurations and processing procedures is omitted.

Figure 8:
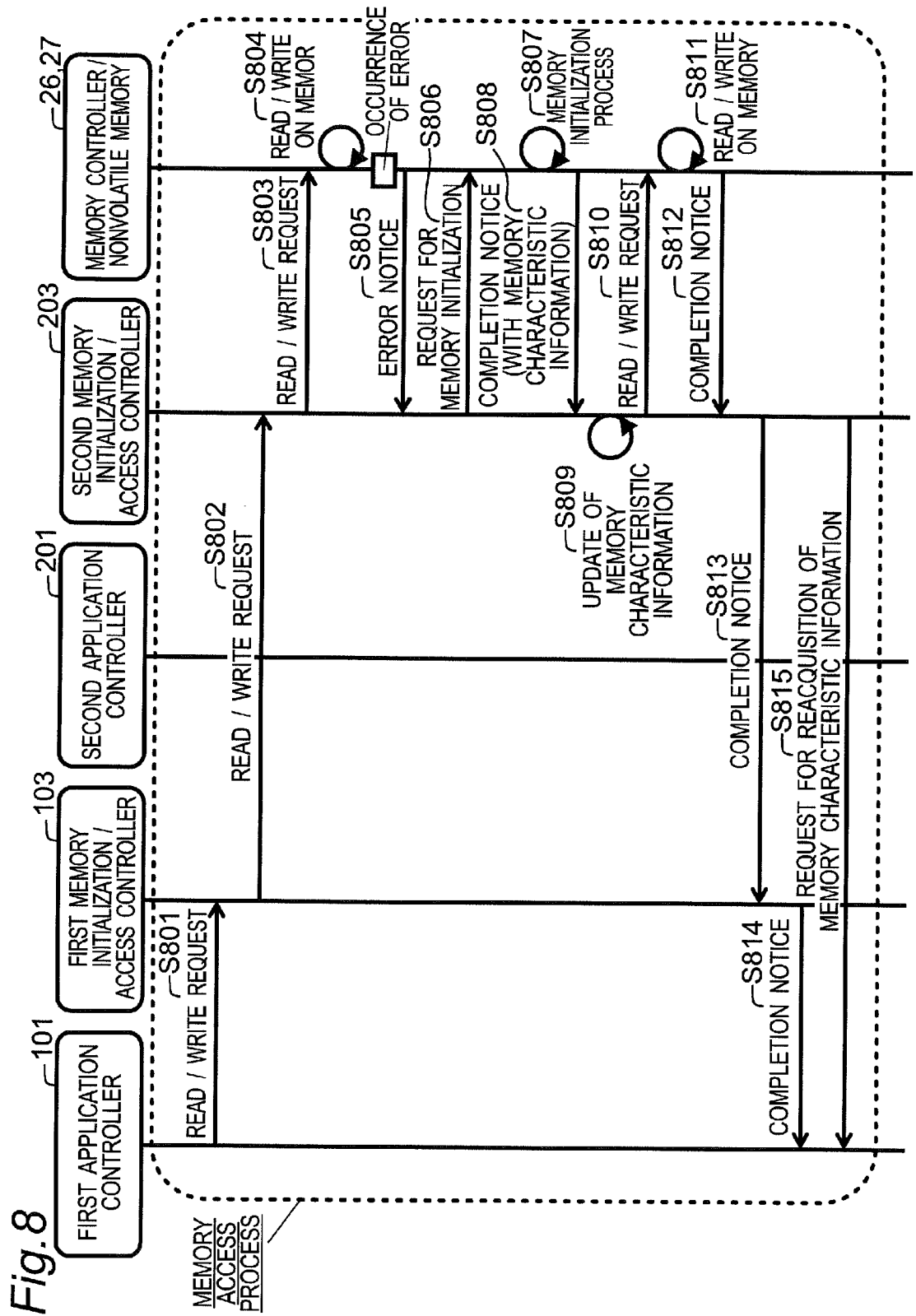
FIG. 8 is a sequence diagram indicating procedures of a memory access process by a wireless memory recording device and a wireless memory access apparatus according to a third embodiment.

FIG. 8 is a sequence diagram showing the processing procedure of a "memory access process" in the present embodiment. In the present embodiment, the case is assumed in which when an error occurs in a nonvolatile memory 27 during a "memory access process", a wireless memory recording device 2 automatically performs a memory initialization process.

At this time, when memory characteristic information includes information of which value changes each time initialization is performed, such as RCA for an SD card, there is a need to notify a wireless memory access apparatus 1 of the change in value. In the present embodiment, the processing procedure of such performance of an automatic memory initialization process in the wireless memory recording device 2 and a state change notification to the wireless memory access apparatus 1 will be described. A specific processing procedure is as follows.

(S801) The first application controller 101 requests the first memory initialization/access controller 103 to perform a read/write process on the nonvolatile memory 27 via the file system controller 102.

(S802) When the first memory initialization/access controller 103 in the wireless memory access apparatus 1 is requested by the first application controller 101 to perform a read/write process on the nonvolatile memory 27, the first memory initialization/access controller 103 requests a second memory initialization/access controller 203 in the wireless memory recording device 2 to perform a read/write process on the nonvolatile memory 27.

(S803) When the second memory initialization/access controller 203 is requested by the first memory initialization/access controller 103 to perform a read/write process on the nonvolatile memory 27, the second memory initialization/access controller 203 requests a memory controller 26 to perform a read/write process on the nonvolatile memory 27.

(S804) When the memory controller 26 is requested by the second memory initialization/access controller 203 to perform a read/write process on the nonvolatile memory 27, the memory controller 26 performs a read/write process on the nonvolatile memory 27 in practice. When an error has not occurred in the read/write process performed by the memory controller 26, a completion notice is transmitted from the memory controller 26 to the first application controller 101 sequentially by the same procedure as that of a memory access process according to the first embodiment (FIG. 6). Thus, detailed description of the case in which an error has not occurred is omitted here. In the following, the case in which an error has occurred in a read/write process performed by the memory controller 26 will be described.

(S805) When an error has occurred in a read/write process, the memory controller 26 notifies the second memory initialization/access controller 203 of the occurrence of an error in the read/write process.

(S806) When the second memory initialization/access controller 203 is notified from the memory controller 26 about the occurrence of an error, the second memory initialization/ access controller 203 requests the memory controller 26 to perform memory initialization for error recovery.

(S807) When the memory controller 26 is requested by the second memory initialization/access controller 203 to perform memory initialization, the memory controller 26 performs a memory initialization process on the nonvolatile memory 27 to obtain memory characteristic information.

(S808) When the memory controller 26 has completed the memory initialization process, the memory controller 26 transmits the memory characteristic information to the second memory initialization/access controller 203 and notifies the second memory initialization/access controller 203 of the completion of the memory initialization process.

(S809) When the second memory initialization/access controller 203 receives the memory characteristic information from the memory controller 26, the second memory initialization/access controller 203 updates memory characteristic information stored in a second memory characteristic information storage 211 in a RAM 22 with the information obtained this time.

(S810) When the second memory initialization/access controller 203 updates the memory characteristic information, the second memory initialization/access controller 203 requests the memory controller 26 again to perform a read/write process on the nonvolatile memory 27.

(S811) When the memory controller 26 is requested by the second memory initialization/access controller 203 to perform a read/write process on the nonvolatile memory 27, the memory controller 26 performs a read/write process on the nonvolatile memory 27 in practice.

(S812) The memory controller 26 notifies the second memory initialization/access controller 203 of the completion of the process. At this time, when an error has occurred again in the read/write process on the nonvolatile memory 27 (S811), the error is notified in this completion notice.

(S813) When the second memory initialization/access controller 203 in the wireless memory recording device 2 is notified from the memory controller 26 about the completion notice, the second memory initialization/access controller 203 notifies the first memory initialization/access controller 103 in the wireless memory access apparatus 1 of the completion of the process. At this time, when an error has occurred again in the read/write process (S811), the error is notified in this completion notice.

(S814) When the first memory initialization/access controller 103 is notified from the second memory initialization/access controller 203 about the completion of the process, the first memory initialization/access controller 103 notifies the first application controller 101 of the completion of the process. At this time, when an error has occurred again in the read/write process (S811), the error is notified in this completion notice.

(S815) After the second memory initialization/access controller 203 in the wireless memory recording device 2 notifies of the completion of the process, the second memory initialization/access controller 203 requests the first memory initialization/access controller 103 in the wireless memory access apparatus 1 to reobtain memory characteristic information. By this, the wireless memory access apparatus 1 can recognize that the memory characteristic information has been changed. Then, the wireless memory access apparatus 1 obtains memory characteristic information from the wireless memory recording device 2 again by the same procedure as the procedure for obtaining memory characteristic information which is described in the second embodiment (steps S704 to S708 in FIG. 7), and updates information stored in the first memory characteristic information storage 111 in the RAM 12.

As described above, when the wireless memory recording device 2 automatically performs memory reinitialization, the wireless memory recording device 2 urges the wireless memory access apparatus 1 to reobtain memory characteristic information. By this, the occurrence of inconsistency in memory characteristic information stored in the wireless memory access apparatus 1 can be prevented.

Furthermore, as described previously, memory initialization is performed on the nonvolatile memory 27 in practice only at the time of memory initialization performed by the memory controller 26 (S807). In a process for obtaining memory characteristic information performed by the wireless memory access apparatus 1 (steps S704 to S708), memory initialization of the nonvolatile memory 27 is not performed. By this, memory characteristic information can be obtained rapidly.

Note that the configurations of the wireless memory recording device 2 and the wireless memory access apparatus 1 described in the present embodiment are an example, and thus may be modified without departing from the spirit and scope of the present embodiment. For example, various variants described in the first embodiment or arts described in other embodiments may be applied to the present embodiment.

4. Fourth Embodiment

Next, a fourth embodiment in the present disclosure will be described. The present embodiment is different from the first embodiment in the processing procedure of a "memory access process". Hence, in the present embodiment, only the processing procedure of a "memory access process" is described, and description of other configurations and processing procedures is omitted.

FIG. 9 is a sequence diagram showing the processing procedure of a "memory access process" in the present embodiment. In the present embodiment, the case is assumed in which in a "memory access process" a wireless memory access apparatus 1 needs to specify, upon memory access, information of which value changes every time memory initialization is performed, such as RCA for an SD card, to a wireless memory recording device 2. That is, the case is assumed in which a value required to access the memory is specified as an argument of a command or the like for a read process, a write process, or obtaining of a card state.

In this case, prior to the issue of a memory access command, the wireless memory access apparatus 1 needs to grasp information that changes, such as RCA (hereinafter, simply called "RCA"). Hence, when the wireless memory recording device 2 automatically performs a memory initialization process for error recovery, as in the third embodiment, memory characteristic information stored in the wireless memory access apparatus 1 needs to be updated every time a memory initialization process is performed. In the present embodiment, a method that eliminates the need for the update process will be described using FIG. 9. A specific processing procedure of a memory access process is as follows.

(S901) A first application controller 101 requests, via a file system controller 102, a first memory initialization/access controller 103 to perform a memory access process (read/write, obtaining of a state, and so on) on a volatile memory 27.

(S902) When the first memory initialization/access controller 103 in the wireless memory access apparatus 1 is requested by the first application controller 101 to perform a memory access process, the first memory initialization/access controller 103 requests a second memory initialization/ access controller 203 in the wireless memory recording device 2 to perform a memory access process on the nonvolatile memory 27. At this time, when an argument of a command for performing a memory access process requires RCA, the first memory initialization/access controller 103 does not set anything to the argument or sets a fixed value, such as zero, to the argument.

(S903) When the second memory initialization/access controller 203 is requested by the first memory initialization/access controller 103 to perform a memory access process, the second memory initialization/access controller 203 refers to RCA stored in a second memory characteristic information storage 211 in a RAM 22. Here, the value of the RCA is, as described in the first embodiment, the one stored in the second memory characteristic information storage 211 in a memory initialization process (step S404 in FIG. 4). In addition, in the present embodiment, information on the RCA is not notified to the wireless memory access apparatus 1 in a wireless connection process (step S506 in FIG. 5) described in the first embodiment. This is to configure a wireless memory control system so that RCA which is information of which value changes every time memory initialization is performed is managed only by the wireless memory recording device 2. By this, a control process between the wireless memory access apparatus 1 and the wireless memory recording device 2 can be simplified.

(S904) When the second memory initialization/access controller 203 refers to the RCA, the second memory initialization/access controller 203 requests a memory controller 26 to perform a memory access process on the nonvolatile memory 27. At this time, performance of a memory access process is requested to the memory controller 26, with the value of the referred RCA (S903) set to the argument of a request command.

(S905) When the memory controller 26 is requested by the second memory initialization/access controller 203 to perform a memory access process, the memory controller 26 performs a memory access process on the nonvolatile memory 27 in practice.

(S906) When the memory controller 26 completes the memory access process, the memory controller 26 notifies the second memory initialization/access controller 203 of the completion of the process.

(S907) When the second memory initialization/access controller 203 in the wireless memory recording device 2 is notified from the memory controller 26 about the completion of the process, the second memory initialization/access controller 203 notifies the first memory initialization/access controller 103 in the wireless memory access apparatus 1 of the completion of the process.

(S908) When the first memory initialization/access controller 103 is notified from the second memory initialization/access controller 203 about the completion of the process, the first memory initialization/access controller 103 notifies the first application controller 101 of the completion of the process.

As described above, in the present embodiment, information of which value changes every time memory initialization is performed, such as RCA, is managed only within the wireless memory recording device 2, without being notified to the wireless memory access apparatus 1 as memory characteristic information. By this, a control process between the wireless memory access apparatus 1 and the wireless memory recording device 2 can be simplified.

Note that the configurations of the wireless memory recording device 2 and the wireless memory access apparatus 1 described in the present embodiment are an example, and thus may be modified without departing from the spirit and scope of the present embodiment. For example, various variants described in the first embodiment or arts described in other embodiments may be applied to the present embodiment.

5. Overall Summary

As described above, in the first to fourth embodiments, as an example of an access system, a wireless memory control system including a wireless memory access apparatus 1 and a wireless memory recording device 2 is described. The wireless memory access apparatus is an example of an access apparatus, and the wireless memory recording device 2 is an example of a functional device.

In the wireless memory recording device 2, the second memory initialization/access controller 203 is an example of an "access controller", the second memory characteristic information storage 211 is an example of a "memory", the wireless communication unit 25 is an example of a "communication unit", and the second application controller 201 is an example of a "communication controller".

The access controller of the functional device performs an initialization process of an additional device before establishing communication between the access apparatus and the functional device, to obtain characteristic information of the additional device from the additional device. In addition, the access controller controls a function specific to the additional device. The memory stores (records) the obtained characteristic information. The communication unit performs transmission and reception of data with the access apparatus. The communication controller performs, for example, an arbitration process for establishing communication between the functional device and the access apparatus, transmission of the characteristic information stored in the memory to the access apparatus, and reception of commands and data to be transmitted from the access apparatus to the functional device to control the function of the additional device.

The access controller performs an initialization process of the additional device before the communication controller performs an arbitration process for communication establishment with the access apparatus. By this, upon communication establishment, the characteristic information of the additional device is already stored in the memory. Thus, the access controller can transmit the characteristic information to the access apparatus upon communication establishment or at any timing after communication establishment.

The wireless communication unit 15 in the wireless memory access apparatus 1 according to the above-described embodiments is an example of a "first communication unit" of the access apparatus in the access system, the first application controller 101 is an example of a "first communication controller", the first memory characteristic information storage 111 is an example of a "first memory", and the first memory initialization/access controller 103 is an example of a "first access controller".

The first communication unit of the access apparatus performs communication between the access apparatus and the functional device. The first communication controller establishes a communication connection by performing an arbitration process for a communication connection with the functional device, using the communication unit. The first communication controller further obtains characteristic information unique to the additional device from the functional device. The first memory stores (records) the characteristic information obtained by the first communication controller. The first access controller generates a command (data) for controlling the functional device, by referring to the characteristic information recorded in the memory, and transmits the command (data) to the functional device through the communication unit.

The access apparatus can, as described above, obtain characteristic information of the additional device from the functional device through communication and transmit a command or the like that controls the functional device, based on the obtained characteristic information. In addition, the access apparatus can obtain the above-described characteristic information without performing an initialization process of the functional device thereby. Obtaining characteristic information in such a manner enables the access apparatus to implement data control, such as writing of data and reading of data, on the additional device which is not directly connected thereto.

In addition, combining the access apparatus and the functional device can enable a wireless memory control system (access system).

As described above, the access apparatus and the functional device perform an initialization process of the function of the additional device provided on the functional device side, before establishing a communication connection between the access apparatus and the functional device. By this, upon communication establishment or at any timing after communication establishment, the access apparatus can obtain, through communication, characteristic information of the additional device which is obtained along with an initialization process or the like.

In addition, when initialization is performed again after communication establishment due to reasons on the functional device side, the communication controller on the functional device side may notify the access apparatus that an initialization process has been performed. By this, when characteristic information obtained by performing an initialization process includes information of which value changes every time an initialization process is performed (e.g., RCA), the fact that an initialization process has been performed (the value of the characteristic information has been changed) can be notified from the functional device side to the access apparatus side. By this, the access apparatus side can be urged to, for example, reobtain characteristic information.

Furthermore, even when characteristic information includes information of which value changes every time an initialization process is performed, the need for the access apparatus to always obtain the latest characteristic information can be eliminated. To implement this, the access controller of the functional device performs, according to characteristic information stored in advance in the functional device, a partial modification, interpolation, or the like, on a portion which is included in a command for controlling the additional device transmitted from the access apparatus and of which value changes every time an initialization process is performed.

6. Other Embodiments

The idea of the above-described embodiments is not limited to the embodiments described above. Various embodiments may be considered. Other embodiments to which the idea of the above-described embodiments can be applied will be described below.

The configurations of the wireless memory recording device 2 and the wireless memory access apparatus 1 described in the above-described embodiments are an example, and thus may be modified without departing from the spirit and scope of the above-described embodiments. For example, although the above-described embodiments show an example in which a CPU, a RAM, a ROM, and so on are configured by individual independent blocks (FIG. 1), some or all of the CPU, the RAM, the ROM, and so on may be integrated into one chip as an LSI. One-chip integration may be implemented using any of various types of LSI called different names, such as an IC, a system LSI, a super LSI, and an ultra LSI, depending on the difference in integration density.

Furthermore, a means for implementing an integrated circuit for the CPU, the RAM, the ROM, and so on is not limited to implementation by an LSI, and may be implemented by a dedicated circuit or a general-purpose processor. It is also possible to use an FPGA (Field Programmable Gate Array) which can be programmed after manufacturing an LSI, or a reconfigurable processor which can reconfigure the connections and settings of circuit cells in an LSI.

Moreover, if a technology for implementing an integrated circuit that replaces LSIs appears due to the advances or derivatives of semiconductor technology, integration of functional blocks (the CPU, the RAM, the ROM, and so on) may be implemented using that technology. Application of biotechnology or the like are possible cases.

In addition, each process of the above-described embodiments may be implemented by hardware or may be implemented by software (including OS (Operating System), middleware, or software implemented with a predetermined library). Furthermore, each process may be implemented by a combination of a process by software and a process by hardware.

Note that when the wireless memory access apparatus 1 and the wireless memory recording device 2 in the above-described embodiments are implemented by hardware, there is a need to make a timing adjustment for performing each process. In the above-described embodiments, for convenience of description, details of a timing adjustment of various types of signals occurring in actual hardware design are omitted.

In addition, the nonvolatile memory 27 may be either a built-in memory or a removable memory. In the case of the nonvolatile memory 27 being a removable memory, in addition to an SD card, any card such as a Memory Stick, a MMC card, a CF (Compact Flash) (registered trademark), a PCI Express card, or an SSD may be used.

In addition, the memory characteristic information shown in FIG. 3 is an example, and thus, all information or only a part of the information shown in FIG. 3 may be used, or other information may be added. In the above-described embodiments, for example, for registers, description is made mainly assuming the case of the nonvolatile memory 27 being an SD card. However, other memory cards may store different types of registers. The idea of the above-described embodiments may also be applied to a wireless memory control system that transmits and receives memory characteristic information including registers relevant to the characteristics of each memory card.

Furthermore, in the above-described embodiments, in the case of the nonvolatile memory 27 being an SD card, the memory identifier register in FIG. 3 corresponds to RCA, as described previously. The RCA is address information which is notified from the SD card to a host device upon initialization of the SD card. The value of the RCA is different every time initialization is performed. Furthermore, since the RCA needs to be used as the arguments of some commands for the SD card, the wireless memory access apparatus 1 needs to obtain the value of the RCA from the wireless memory recording device 2 in a wireless connection process and a memory access right obtaining process. Thus, when there is information of which value changes at each initialization, such as RCA, if memory initialization is performed every time a wireless connection is established without applying the arts according to the above-described embodiments, then the value of the RCA needs to be notified to the wireless memory access apparatus 1 every time memory initialization is performed. Thus, in that case, the time required for a connection process increases. Hence, by applying the arts according to the above-described embodiments to such a case, the effect that the time required for a connection process can be reduced becomes greater.

Likewise, as an example of other information added to the memory characteristic information shown in FIG. 3, information indicating whether there are extensions is considered. In various types of memory cards including an SD card, in particular, various extensions are defined such as copyright protection function for commercial content, data encryption function for personally-owned content, smart card function (including communication function with a contactless between smart card reader/accounting server terminal), and so on, in addition to the basic function of reading and writing from/to the memory. Information about the extensions, such as whether those extensions are supported and individual setting information about supported functions, may be added to the memory characteristic information.

Furthermore, as an example of other information added to the memory characteristic information, detailed setting information about buses is considered. A type of bus for accessing a nonvolatile memory is defined by a combination of various technical requirements. The various technical requirements not only include a simple speed difference due to the difference in clock frequency, but also include the difference in the type, version, addressing bit width (32-bit addressing, 64-bit addressing, and so on) of a compatible upper transfer protocol, the difference in clock sampling means (SDR, DDR, and so on), and the like. Hence, various setting information about those types of buses may be added to the memory characteristic information.

In addition, in the above-described embodiments, as an example of the functional device, the wireless memory recording device 2 including a device that functions as a memory (the nonvolatile memory 27 in the above-described embodiments) is described. However, the functional device is not limited thereto. The idea of the above-described embodiments can also be applied to a functional device that includes an additional device having other functions than a memory. The functional device may include, instead of the nonvolatile memory 27, for example, an additional device having communication function such as tuner function or Bluetooth (hereinafter, referred to as an "I/O device"). A process performed upon communication establishment in a functional device including an I/O device will be described below. Upon an initialization process of the I/O device, the functional device obtains characteristic information indicating the characteristics of the I/O device from the I/O device. Then, when the functional device performs a wireless connection process for establishing communication with an access apparatus, the functional device transmits to the access apparatus the characteristic information obtained in the initialization process performed earlier, without initializing the I/O device. Then, the access apparatus stores the received characteristic information, and uses the stored characteristic information as necessary. As such, upon communication establishment between the access apparatus and the functional device including the I/O device, too, without performing initialization of the functional device, characteristic information of the I/O device which is obtained beforehand may be transmitted to the access apparatus. Note that the access apparatus can determine the type of an additional device included in the functional device as follows. Specifically, the access apparatus first transmits a command for a nonvolatile memory to the functional device. When the access apparatus receives a normal response, the access apparatus determines that the additional device is a nonvolatile memory. On the other hand, when the access apparatus receives a response indicating abnormality or when the access apparatus has not been able to receive a response within a predetermined period of time, the access apparatus can determine that the additional device included in the functional device is an I/O device.

The embodiments have been described above as examples of the art of the present disclosure. For this purpose, the detailed description and the attached drawings have been disclosed. Therefore, some of the elements described in the detailed description and shown in the attached drawings may be unnecessary to solve the problem. Therefore, the unnecessary element should not be instantly recognized as a necessary element merely because being described in the detailed description and shown in the attached drawings.

Further, the above described embodiments exemplify the art of the present disclosure. Therefore, The above described embodiments can be subject to various changes, substitutions, addition, omission and/or the like without departing from the scope of the claims and the their equivalent.

INDUSTRIAL APPLICABILITY

The idea of the present disclosure can be applied to a host apparatus and a functional device that can perform remote access where a connection is established through wireless communication or the like.

What is claimed is:
1. A functional device capable of communicating with an access apparatus through wireless communication, wherein
   at least one additional device can be connected to the functional device,
   the functional device comprises:
   an access controller that performs an initialization process of the additional device to obtain characteristic information of the additional device from the additional device, before receiving a request for wireless connection establishment from the access apparatus, the characteristic information being obtained from the additional device as a result of the initialization process;
   a memory that stores the obtained characteristic information before receiving the request for wireless connection establishment from the access apparatus;
   a communication unit that performs transmission and reception of data with the access apparatus; and
   a communication controller that transmits the characteristic information stored in the memory to the access apparatus without performing again an initialization process of the additional device after receiving the request for wireless connection establishment from the access apparatus, the transmitted characteristic information being obtained from the additional device as the result of the initialization process performed before receiving the request for wireless connection establishment, and
   when the additional device is a storage medium, the characteristic information includes at least one piece of capacity information indicating overall capacity of the additional device, memory state information indicating whether writing to the additional device is allowed, identifier information including an identifier identifying a type of the additional device, information of which value changes every time the initialization process is performed, and register information obtained from a value of a register of the additional device.

2. The functional device according to claim 1, wherein when the communication controller has transferred a right to control the additional device to the access apparatus, the access controller accepts control of the functional device from the access apparatus through the communication unit.

3. The functional device according to claim 1, wherein when the communication controller receives a command instructing to initialize the additional device from the access apparatus through the communication unit, the communication controller sends the characteristic information stored in the memory to the access apparatus in response to the command, without performing an initialization process of the additional device.

4. The functional device according to claim 1, wherein the communication controller transmits the characteristic information of the additional device in an arbitration process for establishing communication between the access apparatus and the functional device.

5. The functional device according to claim 1, wherein the communication controller performs an arbitration process for establishing communication between the access apparatus and the functional device and transmission of the characteristic information of the additional device, in different independent processes.

6. The functional device according to claim 1, wherein when characteristic information obtained when the communication controller performs an initialization process of the functional device after establishing communication between the access apparatus and the functional device includes information of which value changes every time the initialization process is performed, the communication controller notifies the access apparatus that the characteristic information has been changed.

7. An access system comprising an access apparatus, and a functional device capable of communicating with the access apparatus through wireless communication, wherein
at least one additional device can be connected to the functional device,
the access apparatus comprises:
a first communication unit that performs data transmission and reception with the functional device through communication;
a first communication controller that causes the first communication unit to establish communication with the functional device to obtain characteristic information of the additional device;
a first memory that stores the characteristic information obtained by the first communication controller; and
a first access controller that controls the additional device through the first communication unit, based on the characteristic information stored in the first memory,
the functional device comprises:
a second access controller that performs an initialization process of the additional device to obtain characteristic information of the additional device from the additional device, before receiving a request for wireless connection establishment from the access apparatus, the characteristic information being obtained from the additional device as a result of the initialization process;
a second memory that stores the characteristic information obtained by the second access controller before receiving the request for wireless connection establishment from the access apparatus;
a second communication unit that performs transmission and reception of data with the access apparatus; and
a second communication controller that transmits the characteristic information stored in the second memory to the access apparatus without performing again an initialization process of the additional device after receiving the request for wireless connection establishment from the access apparatus, the transmitted characteristic information being obtained from the additional device as the result of the initialization process performed before receiving the request for wireless connection establishment, and
when the additional device is a storage medium, the characteristic information includes at least one piece of capacity information indicating overall capacity of the additional device, memory state information indicating whether writing to the additional device is allowed, identifier information including an identifier identifying a type of the additional device, information of which value changes every time the initialization process is performed, and register information obtained from a value of a register of the additional device.

8. The access system according to claim 7, wherein when the second communication controller has transferred a right to control the additional device to the access apparatus, the second access controller accepts control of the functional device from the access apparatus through the second communication unit.

9. The access system according to claim 7, wherein when the second communication controller receives a command instructing to initialize the additional device from the access apparatus through the second communication unit, the second communication controller sends the characteristic information stored in the second memory to the access apparatus in response to the command, without performing the initialization process of the additional device.

10. The access system according to claim 7, wherein the second communication controller transmits the characteristic information of the additional device in an arbitration process for establishing communication between the access apparatus and the functional device.

11. The access system according to claim 7, wherein the second communication controller performs an arbitration process for establishing communication between the access apparatus and the functional device and transmission of the characteristic information of the additional device, in different independent processes.

12. The access system according to claim 7, wherein when the characteristic information obtained when the second communication controller performs an initialization process of the functional device after establishing communication between the access apparatus and the functional device includes information of which value changes every time the initialization process is performed, the second communication controller notifies the access apparatus that the characteristic information has been changed.

13. A communication establishing method used when a functional device capable of communicating with an access apparatus through wireless communication establishes communication between the functional device and the access apparatus, wherein
at least one additional device can be connected to the functional device, and
the method comprises:
performing an initialization process of the additional device to obtain characteristic information of the additional device from the additional device, before receiving a request for wireless connection establishment from the access apparatus, the characteristic information being obtained from the additional device as a result of the initialization process;

storing the obtained characteristic information before receiving the request for wireless connection establishment from the access apparatus;

performing transmission and reception of data with the access apparatus; and transmitting the stored characteristic information to the access apparatus without performing again an initialization process of the additional device after receiving the request for wireless connection establishment from the access apparatus, the transmitted characteristic information being obtained from the additional device as the result of the initialization process performed before receiving the request for wireless connection establishment.

* * * * *